US009210428B2

(12) United States Patent
Kondo

(10) Patent No.: US 9,210,428 B2
(45) Date of Patent: Dec. 8, 2015

(54) APPARATUS AND METHOD OF ADAPTIVE BLOCK FILTERING OF TARGET SLICE

(71) Applicant: Sony Corporation, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/032,766

(22) Filed: Sep. 20, 2013

(65) Prior Publication Data

US 2014/0023150 A1 Jan. 23, 2014

Related U.S. Application Data

(63) Continuation of application No. 12/820,305, filed on Jun. 22, 2010.

(30) Foreign Application Priority Data

Jul. 31, 2009 (JP) .................................. 2009-179394

(51) Int. Cl.
*H04N 7/12* (2006.01)
*H04N 19/80* (2014.01)
*H04N 19/172* (2014.01)
(Continued)

(52) U.S. Cl.
CPC ......... *H04N 19/0089* (2013.01); *H04N 19/117* (2014.11); *H04N 19/172* (2014.11); *H04N 19/196* (2014.11); *H04N 19/46* (2014.11);
(Continued)

(58) Field of Classification Search
CPC ...................... H04N 7/26888; H04N 19/00909
See application file for complete search history.

(56) References Cited

U.S. PATENT DOCUMENTS

2006/0078209 A1 4/2006 Kobayashi
2007/0071108 A1 3/2007 Wang
(Continued)

FOREIGN PATENT DOCUMENTS

| JP | 6-178127 A | 6/1994 |
|----|------------|--------|
| JP | 2000-59769 A | 2/2000 |

(Continued)

OTHER PUBLICATIONS

Yi-Jen Chiu, et al., "Adaptive (Wiener) Filter for Video Compression," International Telecommunication Union, Telecommunication Standardization Sector, Study Group 16—Contribution 437, Apr. 2008, pp. 1-7.

(Continued)

*Primary Examiner* — Richard Torrente
(74) *Attorney, Agent, or Firm* — Oblon, McClelland, Maier & Neustadt, L.L.P.

(57) ABSTRACT

Provided is an image processing apparatus including: area determination unit configured to determine whether or not an area of a control block functioning as control unit for filtering of an image includes a processing-target slice area of a plurality of slices formed in a frame of an encoded image; control information creation unit configured to create filter control information representing whether or not the filtering is performed for the area of the control block including a processing-target slice for each area of the control block including the processing-target slice when the area determination unit determines that the area of the control block includes the area of the processing-target slice; and filter unit configured to perform filtering for the image based on the filter control information created by the control information creation unit.

11 Claims, 25 Drawing Sheets

(51) Int. Cl.

| | |
|---|---|
| *H04N 19/46* | (2014.01) |
| *H04N 19/196* | (2014.01) |
| *H04N 19/117* | (2014.01) |
| *H04N 19/463* | (2014.01) |
| *H04N 19/82* | (2014.01) |

(52) U.S. Cl.
CPC ............ *H04N19/463* (2014.11); *H04N 19/80* (2014.11); *H04N 19/82* (2014.11)

(56) References Cited

U.S. PATENT DOCUMENTS

| | | | |
|---|---|---|---|
| 2007/0183676 A1* | 8/2007 | Hannuksela et al. | 382/243 |
| 2010/0086029 A1* | 4/2010 | Chen et al. | 375/240.12 |
| 2011/0026600 A1 | 2/2011 | Kenji | |
| 2011/0026611 A1 | 2/2011 | Kenji | |
| 2012/0093217 A1* | 4/2012 | Jeon et al. | 375/240.02 |
| 2012/0121188 A1 | 5/2012 | Kenji | |
| 2013/0028531 A1 | 1/2013 | Sato | |
| 2013/0051477 A1 | 2/2013 | Sasaki | |
| 2013/0071039 A1 | 3/2013 | Sato | |
| 2013/0216149 A1 | 8/2013 | Sato | |
| 2013/0251032 A1 | 9/2013 | Tanaka | |
| 2013/0251050 A1 | 9/2013 | Ikeda et al. | |
| 2013/0259142 A1 | 10/2013 | Ikeda et al. | |
| 2013/0301739 A1 | 11/2013 | Sato | |
| 2013/0301743 A1 | 11/2013 | Ikeda et al. | |
| 2013/0301942 A1 | 11/2013 | Kondo | |
| 2013/0322525 A1 | 12/2013 | Tanaka | |
| 2013/0330012 A1 | 12/2013 | Sato | |
| 2013/0343451 A1 | 12/2013 | Sato | |
| 2014/0003510 A1 | 1/2014 | Lu et al. | |
| 2014/0064362 A1 | 3/2014 | Sato | |
| 2014/0072037 A1 | 3/2014 | Sato | |
| 2014/0086322 A1 | 3/2014 | Takahashi et al. | |
| 2014/0092958 A1 | 4/2014 | Sato | |
| 2014/0105281 A1 | 4/2014 | Sato et al. | |

FOREIGN PATENT DOCUMENTS

| | | |
|---|---|---|
| JP | 2004-159331 | 6/2004 |
| JP | 2005-123732 | 5/2005 |
| JP | 2008-182562 A | 8/2008 |
| JP | 2011-503979 | 1/2011 |
| WO | WO 2009/074117 A1 | 6/2009 |
| WO | WO 2010/143427 A1 | 12/2010 |

OTHER PUBLICATIONS

Takeshi Chujoh, et al., "Block-based Adaptive Loop Filter," ITU—Telecommunications Standardization Sector, Study Group 16 Question 6, Video Coding Experts Group (VCEG) Contribution, VCEG-AI18, Jul. 2008, pp. 1-6.

Takeshi Chujoh, et al., "Specification and experimental results of Quadtree-based Adaptive Loop Filter," ITU—Telecommunications Standardization Sector, Study Group 16 Question 6, Video Coding Experts Group (VCEG) Contribution, VCEG-AK22(r1), Apr. 2009, pp. 1-11.

Office Action issued Feb. 26, 2013, in Japanese Patent Application No. 2009-179394.

Office Action issued Apr. 9, 2013, in Japanese Patent Application No. 2009-179394.

U.S. Appl. No. 14/123,375, filed Dec. 2, 2013, Ikeda.

Office Action issued Jan. 9, 2014 in Japanese Patent Application No. 2013-051882.

Office Action issued Jul. 22, 2014, in Japanese Patent Application No. 2013-206930 (with Cited Reference).

Office Action issued Oct. 16, 2014, in Japanese Patent Application No. 2013-206930.

Japanese Office Action issued Mar. 18, 2015 in Patent Application No. 2013-206930 (without English Translation).

* cited by examiner

FIG. 2
MACROBLOCK TYPES
16×16       16×8        8×16        8×8
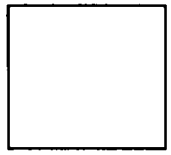  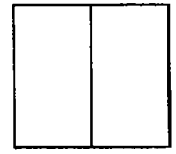 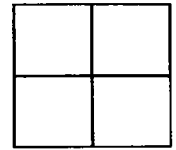
SUB MACROBLOCK TYPES
8×8         8×4         4×8         4×4
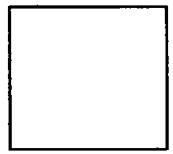 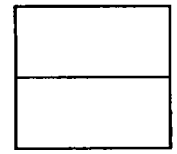 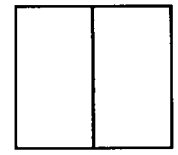 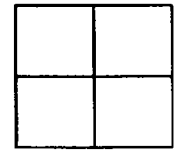

FIG. 4C

| 1 | 1 | 1 | 0 | 0 | 1 | 1 | 1 |
|---|---|---|---|---|---|---|---|
| 1 | 0 | 1 | 1 | 0 | 0 | 1 | 1 |
| 0 | 1 | 1 | 1 | 1 | 1 | 0 | 0 |
| 1 | 0 | 0 | 1 | 1 | 1 | 1 | 0 |
| 0 | 1 | 1 | 1 | 1 | 0 | 0 | 1 |

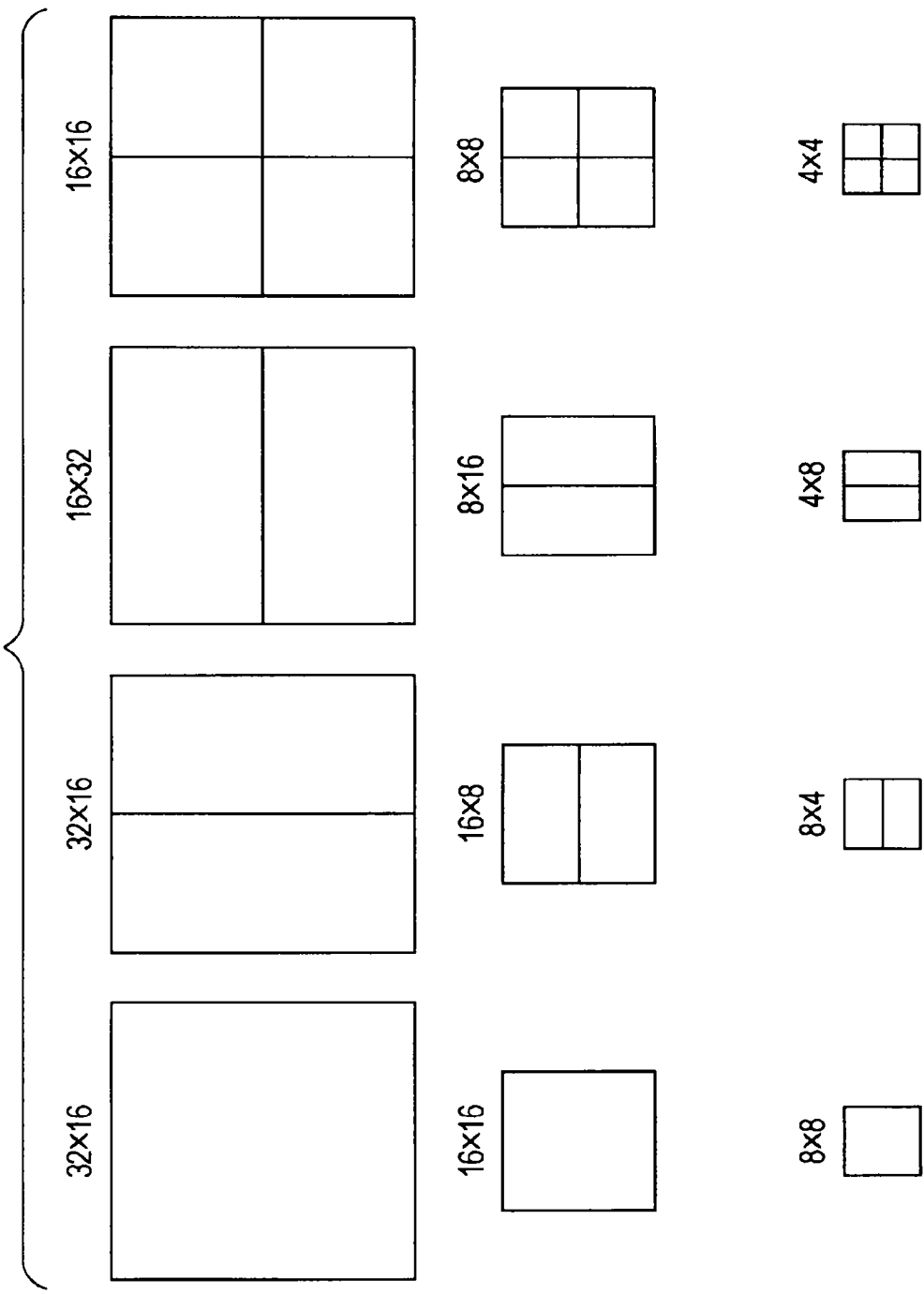

APPARATUS AND METHOD OF ADAPTIVE BLOCK FILTERING OF TARGET SLICE

CROSS-REFERENCE TO RELATED APPLICATIONS

The present application is a continuation application of U.S. application Ser. No. 12/820,305, filed Jun. 22, 2010, which contains subject matter related to that disclosed in Japanese Priority Patent Application JP 2009-179394 filed in the Japan Patent Office on Jul. 31, 2009, the entire contents of both of which are incorporated herein by reference.

BACKGROUND OF THE INVENTION

1. Field of the Invention

The present invention relates to an image processing apparatus and method, and more particularly, to an image processing apparatus and method by which it is possible to suppress degradation of a encoding efficiency by locally controlling filtering during encoding or decoding.

2. Description of the Related Art

Recently, apparatuses complying with a standard such as the MPEG (Moving Picture Experts Group) are commercially available in both transmitting information from a broadcasting center or the like and receiving information in customer premises. Such apparatuses digitally handle and compress image information using an orthogonal conversion such as a discrete cosine transform and a motion compensation based on characteristic redundancy of the image information in order to transmit and accumulate information with an excellent efficiency.

Particularly, the MPEG2 (ISO (International Organization for Standardization)/IEC (International Electrotechnical Commission) 13818-2) defined as a general image encoding scheme is currently used in a wide variety fields such as both professional and consumer applications, both interlaced and the progressive scanning images, and is a standard which encompasses both standard and high resolution images. According to the MPEG2 compression scheme, for example, a bit rate of 4 to 8 Mbps is allocated to a standard resolution interlaced image of 720×480 pixels, and a bit rate of 18 to 22 Mbps is allocated to a high resolution interlaced image of 1920×1088 pixels so that a high compression rate and an excellent image quality can be realized.

While the MPEG2 is mainly targeted to a high quality image encoding suitable for a broadcasting, it fails to provide an encoding scheme having a bit rate lower than that of the MPEG1, i.e., with a higher compression rate. As mobile phones are widely used, it is anticipated that demands on such an encoding scheme increases in the future. Accordingly, the MPEG4 encoding scheme has been standardized. As the image encoding scheme, such a standard has been internationally approved as ISO/IEC 14496-2 in December 1998.

Furthermore, recently, for the purpose of encoding a TV conference image, H.26L (ITU-T (ITU Telecommunication Standardization Sector) Q6/16 VCEG (Video encoding Experts Group)) is being standardized. According to H.26L, it is known that a large amount of computations are necessary to perform the encoding and the decoding in comparison with existing encoding schemes such as MPEG2 or MPEG4, but higher encoding efficiency can be realized. In addition, currently, as one of the MPEG4 activities, a standardization for realizing higher encoding efficiency is being developed as a Joint Model of Enhanced-Compression Video encoding on the basis of H.26L by including additional functionalities that are not supported by H.26L. As a schedule of the standardization, an international standard based on the names of H.264 and MPEG4 Part 10 (AVC (Advanced Video Coding)) has been approved in March 2003.

Recently, as a next-generation video encoding technology, an adaptive loop filter (ALF) is being reviewed (e.g., refer to Yi-Jen Chiu and L. Xu, "Adaptive (Wiener) Filter for Video Compression," ITU-T SG16 Contribution, C437, Geneva, April 2008). This adaptive filter can alleviate block distortion or quantization distortion that is difficult to handle using a deblock filter by performing an optimal filtering for each frame.

However, generally, since the image locally has various characteristics, the optimal filter coefficient is locally different. In the method disclosed in the Yi-Jen Chiu and L. Xu, "Adaptive (Wiener) Filter for Video Compression," ITU-T SG16 Contribution, C437, Geneva, April 2008, since the same filter coefficient is applied to all pixels in a single frame, image quality may be improved in the entire frame but may be degraded locally.

In this regard, a method of omitting the filtering in the area where image quality is locally degraded has been proposed (e.g., refer to Takeshi. Chujoh, et al., "Block-based Adaptive Loop Filter," ITU-T SG16 Q6 VCEG Contribution, AI18, Germany, July, 2008, and T. Chujoh, N. Wada, and G. Yasuda, "Quadtree-based Adaptive Loop Filter," ITU-T SG16 Q6 VCEG Contribution, VCEG-AK22(r1), Japan, April, 2009). In this method, the image encoding apparatus controls whether or not the filtering is performed for each control block by matching with a plurality of control blocks compactly arranged on the area of the image. The image encoding apparatus establishes flag information for each block and performs the adaptive filtering based on the flag information. Similarly, the image decoding apparatus performs the adaptive filtering based on the flag information.

However, a method of performing the image encoding or decoding for each slice by dividing a single frame into a plurality of slices (multi-slice) has been proposed. Takeshi. Chujoh, et al., "Block-based Adaptive Loop Filter," ITU-T SG16 Q6 VCEG Contribution, AI18, Germany, July, 2008, and T. Chujoh, N. Wada, and G. Yasuda, "Quadtree-based Adaptive Loop Filter," ITU-T SG16 Q6 VCEG Contribution, VCEG-AK22(r1), Japan, April, 2009 describe a method of establishing blocks for a single entire frame and creating and transmitting flag information for all of the blocks but fail to describe how to process the flag information in such a multi-slice case and how to create and use the flag information.

Takeshi. Chujoh, et al., "Block-based Adaptive Loop Filter," ITU-T SG16 Q6 VCEG Contribution, AI18, Germany, July, 2008, and T. Chujoh, N. Wada, and G. Yasuda, "Quadtree-based Adaptive Loop Filter," ITU-T SG16 Q6 VCEG Contribution, VCEG-AK22(r1), Japan, April, 2009 just describe that the image encoding apparatus creates the flag information of all blocks within the frame for a single slice within the frame. That is, even in the case of the multi-slice, the image encoding apparatus is to create the flag information of all blocks within the frame for each slice.

However, the flag information of the blocks of the area other than the processing-target slice is not necessary. The created flag information is encoded together with the image data and included in the image compression information. That is, according to the methods disclosed in Takeshi. Chujoh, et al., "Block-based Adaptive Loop Filter," ITU-T SG16 Q6 VCEG Contribution, AI18, Germany, July, 2008, and T. Chujoh, N. Wada, and G. Yasuda, "Quadtree-based Adaptive Loop Filter," ITU-T SG16 Q6 VCEG Contribution, VCEG-AK22(r1), Japan, April, 2009, when the multi-slice is applied, the image compression information may unnecessarily increase and degrade encoding efficiency.

SUMMARY OF THE INVENTION

It is desirable to provide a method of suppressing degradation of the encoding efficiency by locally controlling the filtering during the encoding or the decoding.

According to an embodiment of the invention, there is provided an image processing apparatus including: area determination means configured to determine whether or not an area of a control block functioning as control unit for filtering of an image includes a processing-target slice area of a plurality of slices formed in a frame of an encoded image; control information creation means configured to create filter control information representing whether or not the filtering is performed for the area of the control block including a processing-target slice, for each area of the control block including the processing-target slice when the area determination means determines that the area of the control block includes the area of the processing-target slice; and filter means configured to perform filtering for the image based on the filter control information created by the control information creation means.

The image processing apparatus may further include slice area specifying means configured to specify the processing-target slice area and control block area specifying means that specifies the area of the control block, wherein the area determination means may determine whether or not the area of the control block specified by the control block area specifying means includes the processing-target slice area specified by the slice area specifying means.

The image processing apparatus may further include control means configured to determine whether or not the processing-target control block area includes the processing-target slice area and control the filter means to perform filtering when a value of the filter control information of the control block determined to include the processing-target slice area represents that the filtering is performed, wherein the filter means may perform the filtering for the processing-target control block area under control of the control means.

The image processing apparatus may further include encoding means configured to create encoded data by encoding the image, wherein the encoding means may encode the filter control information created by the control information creation means and add the encoded filter control information to the encoded data.

The image processing apparatus may further include filter coefficient calculation means configured to calculate a filter coefficient of the filtering, wherein the encoding means encodes the filter coefficient calculated by the filter coefficient calculation means and adds the encoded filter coefficient to the encoded data.

According to another embodiment of the invention, there is provided an image processing method including the steps of: in area determination means of an image processing apparatus, determining whether or not an area of a control block functioning as control unit of filtering for an image includes a processing-target slice area of a plurality of slices formed in a frame of an encoded image; in control information creation means of the image processing apparatus, creating filter control information representing whether or not the filtering is performed for the area of the control block including the processing-target slice, for each control block including the processing-target slice when it is determined that the area of the control block includes the processing-target slice area; and in filter means of the image processing apparatus, performing filtering for the image based on the created filter control information.

According to still another embodiment of the invention, there is provided an image processing apparatus including: control means configured to, for each control block functioning as control unit of filtering for an image, determine whether or not the area of the control block of the image includes a processing-target slice area of a plurality of slices formed in a frame of the image and perform control such that the filtering is performed for the area of the control block of the image when a value of filter control information representing whether or not the filtering is performed for the control block determined to include the processing-target slice area represents that the filtering is performed; and filter means configured to perform the filtering for the area of the control block of the image under control of the control means.

The image processing apparatus may further include decoding means configured to create the image by decoding encoded data obtained by encoding the image, wherein the decoding means decodes the encoded filter control information added to the encoded data, the control means performs control such that the filtering is performed for the area of the control block of the image when the value of the filter control information obtained by the decoding in the decoding means represents that the filtering is performed, and the filter means performs the filtering for the area of the control block of the image under control of the control means.

According to still another embodiment of the invention, there is provided an image processing method including the steps of: in control means of the image processing apparatus, determining, for each control block functioning as control unit of filtering for an image, whether or not the area of the control block of the image includes a processing-target slice area of a plurality of slices formed in a frame of the image and performing control such that the filtering is performed for the area of the control block of the image when a value of filter control information representing whether or not the filtering is performed for the control block determined to include the processing-target slice area represents that the filtering is performed; and in filter means of the image processing apparatus, performing the filtering for the area of the control block of the image under control of the control means.

According to an embodiment of the invention, whether or not an area of a control block functioning as control unit of filtering for an image includes a processing-target slice area of a plurality of slices formed in a frame of an encoded image is determined. Filter control information representing whether or not the filtering is performed for the area of the control block including the processing-target slice is created for each control block including the processing-target slice when it is determined that the area of the control block includes the processing-target slice area. The filtering is performed for the image based on the created filter control information.

According to another embodiment of the invention, for each control block functioning as control unit of filtering for an image, whether or not the area of the control block of the image includes a processing-target slice area of a plurality of slices formed in a frame of the image is determined, and control is performed such that the filtering is performed for the area of the control block of the image when a value of filter control information representing whether or not the filtering is performed for the control block determined to include the processing-target slice area represents that the filtering is performed. The filtering is performed for the area of the control block of the image under control of the control means.

According to embodiments of the invention, the image can be encoded or decoded. Particularly, it is possible to suppress degradation of the encoding efficiency by locally controlling the filtering during the encoding or the decoding. For example, even when each frame of the image is encoded or decoded by dividing into a plurality, it is possible to suppress degradation of the encoding efficiency.

BRIEF DESCRIPTION OF THE DRAWINGS

FIG. 2 illustrates a motion prediction/compensation process of a variable block size.

FIGS. 4A, 4B, and 4C illustrate an ALF block and a filter block flag.

FIGS. 17A to 17D illustrate another example of the ALF block and the filter block flag.

FIG. 25 illustrates an example of a macroblock.

DESCRIPTION OF THE PREFERRED EMBODIMENTS

Embodiments of the invention will now be described. The descriptions will be made in the following sequence.
 1. First Embodiment (Image Encoding Apparatus)
 2. Second Embodiment (Image Decoding Apparatus)
 3. Third Embodiment (Modification of a filter block flag creation process)
 4. Fourth Embodiment (QALF)
 5. Fifth Embodiment (Personal Computer)
 6. Sixth Embodiment (Television Set)
 7. Seventh Embodiment (Mobile Phone Device)
 8. Eighth Embodiment (Hard Disc Recorder)
 9. Ninth Embodiment (Camera)

1. First Embodiment

Device Configuration

Figure 1:
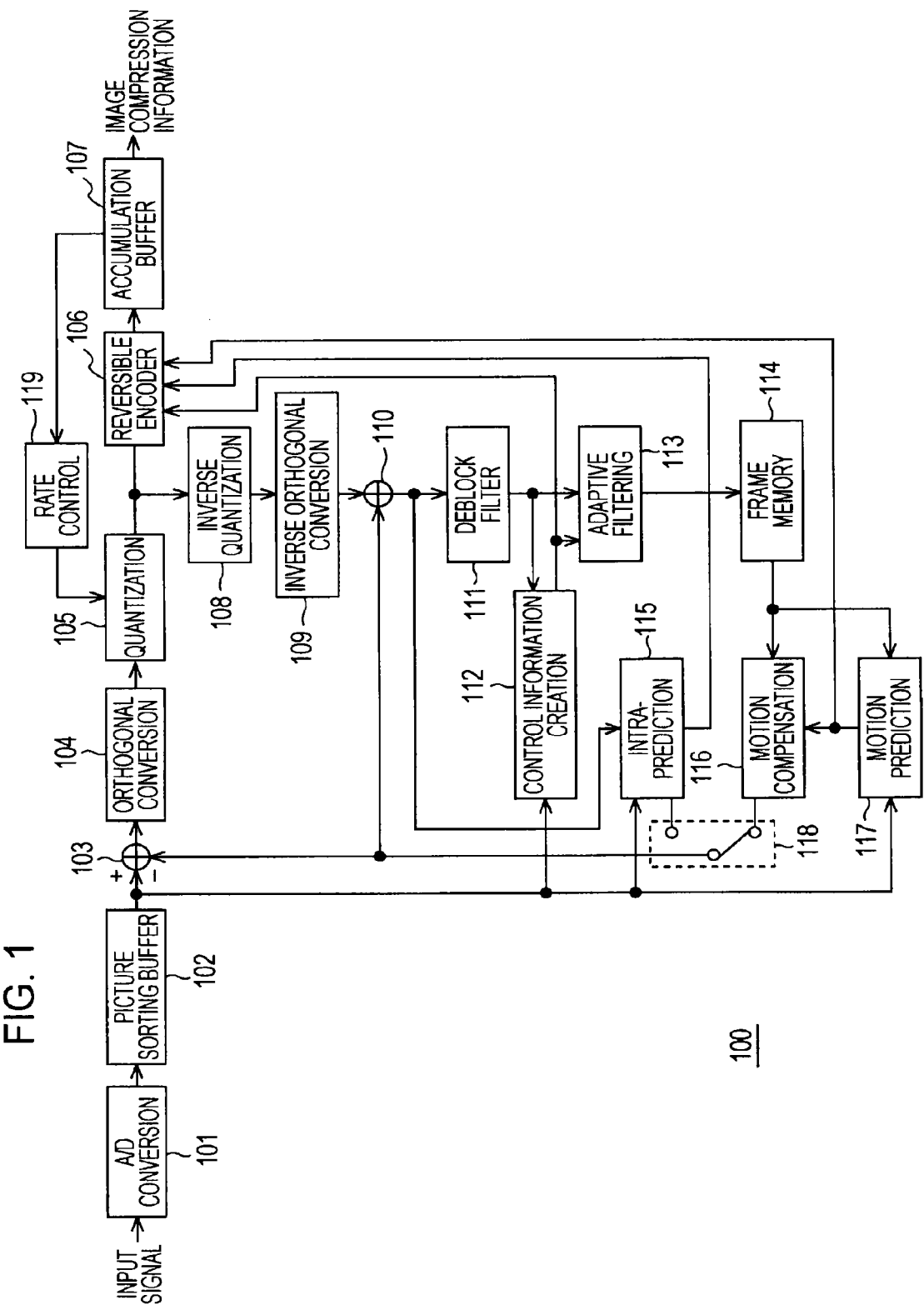
FIG. 1 is a block diagram illustrating an example of a main configuration of an image encoding apparatus according to an embodiment of the invention.

FIG. 1 illustrates a configuration of the image encoding apparatus as an image processing apparatus according to an embodiment of the invention.

The image encoding apparatus 100 shown in FIG. 1 is an encoder for compressively encoding an image based on, for example, H.264 and MPEG4, Part 10 Advanced Video Coding (hereinafter, denoted as H.264/AVC) and employs an adaptive loop filter.

In the example of FIG. 1, the image encoding apparatus 100 includes an A/D (Analog/Digital) conversion unit 101, a picture sorting buffer 102, a computation unit 103, an orthogonal conversion unit 104, a quantization unit 105, a reversible encoder 106, and an accumulation buffer 107. In addition, the image encoding apparatus 100 includes an inverse quantization unit 108, an inverse orthogonal conversion unit 109, a computation unit 110, and a deblock filter 111. Furthermore, the image encoding apparatus 100 includes a control information creation unit 112, an adaptive filtering unit 113, and a frame memory 114. Still furthermore, the image encoding apparatus 100 includes an intra-prediction unit 115, a motion compensation unit 116, a motion prediction unit 117, and a prediction image selection unit 118. The image encoding apparatus 100 also includes a rate control unit 119.

The A/D conversion unit 101 A/D converts the input image and outputs it to the picture sorting buffer 102 to store it. The picture sorting buffer 102 sorts the images of frames stored in a display sequence into an encoding frame sequence according to the GOP (Group of Pictures) structure.

The computation unit 103 subtracts a prediction image from the intra-prediction unit 115 selected by the prediction image selection unit 118 or a prediction image from the motion compensation unit 116 from the image read from the picture sorting buffer 102 and outputs the difference information thereof to the orthogonal conversion unit 104. The orthogonal conversion unit 104 performs orthogonal conversion such as a discrete cosine transform or a Karhunen and Loeve transform according to the difference information from computation unit 103 for the difference information to output a conversion coefficient thereof. The quantization unit 105 quantizes the conversion coefficient output from the orthogonal conversion unit 104.

The quantized conversion coefficient output from the quantization unit 105 is input to the reversible encoder 106. The reversible encoder 106 compresses the quantized conversion coefficient by performing a reversible encoding such as a variable length encoding or an arithmetic encoding.

The reversible encoder 106 obtains information representing the intra-prediction or the like from the intra-prediction unit 114 and obtains information representing the inter-prediction mode from the motion prediction unit 117. Hereinafter, the information representing the intra-prediction will be also referred to as intra-prediction mode information. In addition, the information representing the information mode representing the inter-prediction will be hereinafter referred to as inter-prediction mode information.

The reversible encoder 106 obtains the control information of the adaptive filtering performed by the adaptive filtering unit 113 from the control information creation unit 112.

The reversible encoder 106 encodes the control information of the adaptive filtering, the information representing the intra-prediction or the inter-prediction mode, the quantization parameters, or the like as well as the quantized conversion coefficient and sets (multiplexes) them as part of the header information in the compression image. The reversible encoder 106 supplies the accumulation buffer 107 with the encoded data to accumulate them.

For example, the reversible encoder 106 performs reversible encoding of a variable length encoding or an arithmetic encoding. As an example of the variable length encoding, a context-adaptive variable length coding (CAVLC) defined by H.264/AVC methods may be used. As an example of the arithmetic encoding, a context-adaptive binary arithmetic coding (CABAC) may be used.

The accumulation buffer 107 temporarily stores the data supplied from the reversible encoder 106 and outputs the data as compression images encoded by H.264/AVC methods, for example, to a recorder or a transmission line or the like located in a subsequent stage not shown in the figures at a predetermined timing.

In addition, the conversion coefficient quantized by the quantization unit 105 is also input to the inverse quantization unit 108. The inverse quantization unit 108 inversely quantizes the quantized conversion coefficient according to a method corresponding to the quantization of the quantization unit 105 and supplies the obtained conversion coefficient to the inverse orthogonal conversion unit 109.

The inverse orthogonal conversion unit 109 performs inverse orthogonal conversion for the supplied conversion coefficient using a method corresponding to the orthogonal conversion processing by the orthogonal conversion unit 104. The output resulting from the inverse orthogonal conversion is supplied to the computation unit 110. The computation unit 110 adds the prediction image supplied from prediction image selection unit 118 to the inverse orthogonal conversion result supplied from the inverse orthogonal conversion unit 109, that is, the restored difference information, to obtain a locally-decoded image (decoding image). The addition result is supplied to the deblock filter 111.

The deblock filter 111 removes block distortion from the decoding image. The deblock filter 111 supplies the distortion removal result to the control information creation unit 112 and the adaptive filtering unit 113.

The control information creation unit 112 obtains the decoding image supplied from the deblock filter 111 and the current input image read from the picture sorting buffer 102 and creates control information of the adaptive filter performed in the adaptive filtering unit 113 therefrom. While details thereof will be described below, the control information includes a filter coefficient, a block size, a filter block flag, or the like.

The control information creation unit 112 supplied the created control information to the adaptive filtering unit 113. In addition, the control information creation unit 112 also supplies the created control information to the reversible encoder 106. As described above, the control information may be reversibly compressed by the reversible encoder 106 and included (multiplexed) in the image compression information. That is, the control information is sent to the image decoding apparatus together with the image compression information.

The adaptive filtering unit 113 performs filtering for the decoding image supplied from the deblock filter 111 using the filter block flag, the block size specification, and the filter coefficient of the control information supplied from the control information creation unit 112 and so on. For example, a Wiener filter may be used as such a filter. Needless to say, various filters other than the Wiener filter may be used. The adaptive filtering unit 113 supplies the filtering result to the frame memory 114 and accumulates them as the reference image.

The frame memory 114 outputs the accumulated reference image to the motion compensation unit 116 and the motion prediction unit 117 at a predetermined timing.

In the image encoding apparatus 100, for example, an I-picture, a B-picture, and a P-picture from the picture sorting buffer 102 are supplied to the intra-prediction unit 115 as an image for the intra-prediction (also, referred to as an intra-processing). In addition, the B-picture and the P-picture read from the picture sorting buffer 102 are supplied to the motion prediction unit 117 as an image for the inter-prediction (also, referred to as an inter-processing).

The intra-prediction unit 115 performs the intra-prediction processing of all the candidates of the intra-prediction mode based on the intra-prediction image read from the picture sorting buffer 102 and the reference image supplied from the frame memory 114 to create the prediction image.

In the intra-prediction unit 115, the information on the intra-prediction mode applied to the corresponding block/macroblock is transmitted to the reversible encoder 106 and encoded as part of the header information in the image compression information. According to the H.264 image information encoding scheme, an intra 4×4 prediction mode, an intra 8×8 prediction mode, and an intra 16×16 prediction mode are defined for the luminance signal, and a prediction mode independent from the luminance signal may be defined for each macroblock for the color difference signal. In the intra 4×4 prediction mode, a single intra-prediction mode is defined for each 4×4 luminance block. In the intra 8×8 prediction mode, a single intra-prediction mode is defined for each 8×8 luminance block. In the intra 16×16 prediction mode and the color difference signal, a single prediction mode is defined for each single macroblock.

The intra-prediction unit 115 calculates a cost function value for the intra-prediction mode that creates the prediction image, and selects the intra-prediction mode that gives a minimum value of the calculated cost function values as an optimal intra-prediction mode. The intra-prediction unit 115 supplies the prediction image generated by the optimal intra-prediction mode to the prediction image selection unit 118.

The motion prediction unit 117 obtains the image information (input image) supplied from the picture sorting buffer 102 and the image information (decoding image) corresponding to the reference frame supplied from the frame memory 114 for the image to be inter-coded and calculates the motion vector. The motion prediction unit 117 supplies the motion vector information representing the calculated motion vector to the reversible encoder 106. The motion vector information is losslessly compressed by the reversible encoder 106 and included in the image compression information. That is, the motion vector information is sent to the image decoding apparatus together with the image compression information.

In addition, the motion prediction unit 117 also supplies the motion vector information to the motion compensation unit 116.

The motion compensation unit 116 performs the motion compensation in response to the motion vector information supplied from the motion prediction unit 117 to create the inter-prediction image information. The motion compensation unit 116 supplies the created prediction image information to the prediction image selection unit 118.

The prediction image selection unit 118 supplies the output of the intra-prediction unit 115 to the computation unit 103 in the case of the intra-coding and supplies the output of the motion compensation unit 116 to the computation unit 103 in the case of the inter-coding.

The rate control unit 119 controls the rate of the quantization motion in the quantization unit 105 so as not to generate overflow or underflow based on the compressed images accumulated in the accumulation buffer 107.

According to the MPEG (Moving Picture Experts Group) 2 scheme, units of the motion prediction/compensation are a motion compensation block, and each of the motion compensation blocks may include independent motion vector information. The motion compensation block size may include 16×16 pixels in the case of the frame motion compensation mode or 16×8 pixels for each of the first and second fields in the case of the field motion compensation mode.

On the contrary, according to the AVC (Advanced Video coding) scheme, as shown in the upper half of FIG. 2, a single macroblock including 16×16 pixels is divided into several partitions of 16×16, 16×8, 8×16, or 8×8 pixels, each of which may have independent motion vector information. Furthermore, as shown in the lower half of FIG. 2, the 8×8 partition may be divided into several sub-partitions of 8×8, 8×4, 4×8, or 4×4 pixels, each of which may have independent motion vector information. The motion prediction/compensation is performed by using this motion compensation block as unit.

Figure 3:
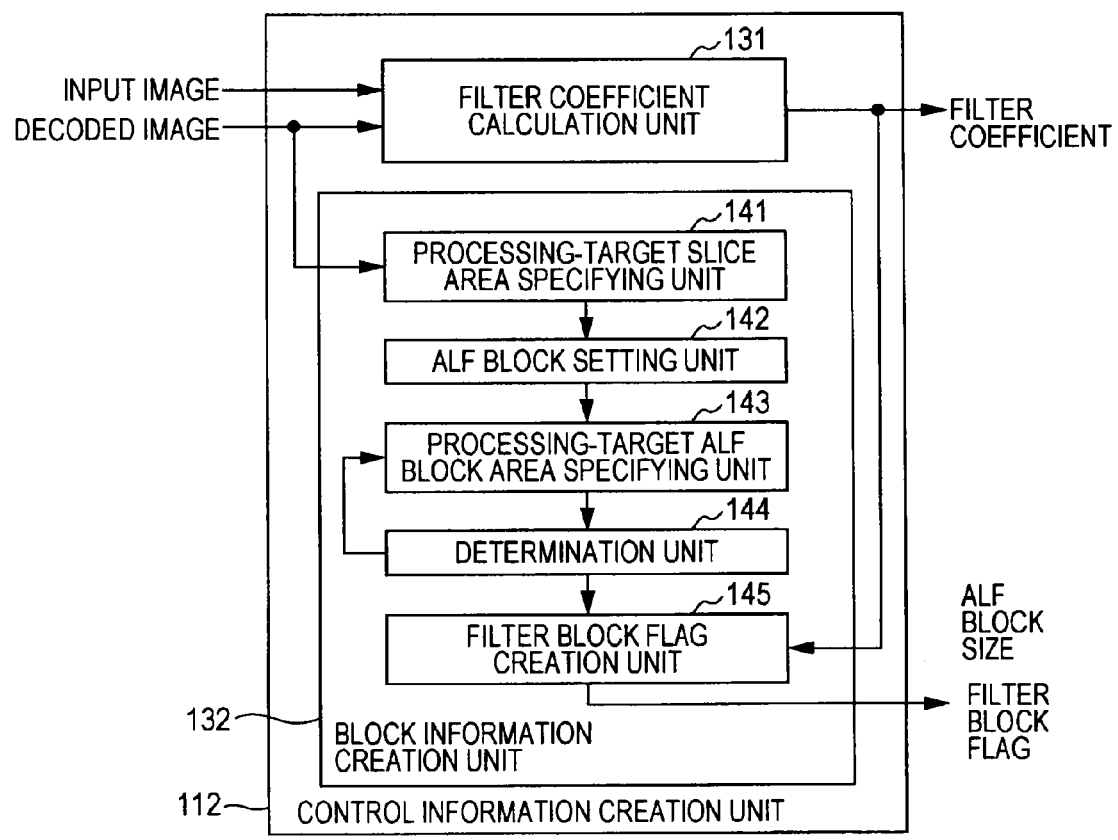
FIG. 3 is a block diagram illustrating an example of a main configuration of a control information creation unit.

FIG. 3 is a block diagram illustrating an example of a main configuration of the control information creation unit 112.

The control information creation unit 112 creates control information used in the adaptive filter (ALF: Adaptive Loop Filter), which is a loop filter, performed in the adaptive filtering unit 113 as described above. The control information creation unit 112 creates, for example, a filter coefficient, an ALF block size, and a filter block flag as the control information.

The control information creation unit 112 has a filter coefficient calculation unit 131 and a block information creation unit 132.

The filter coefficient calculation unit 131 obtains the decoding image supplied from the deblock filter 111 and the current input image read from the picture sorting buffer 102 and calculates the filter coefficient of the ALF for each frame based on them.

The block information creation unit 132 determines the ALF block size based on the decoding image supplied from the deblock filter 111 and the filter coefficient calculated by the filter coefficient calculation unit 131 and creates the filter block flag for each ALF block within the processing-target slice.

Figure 4A:
Figure 4B:
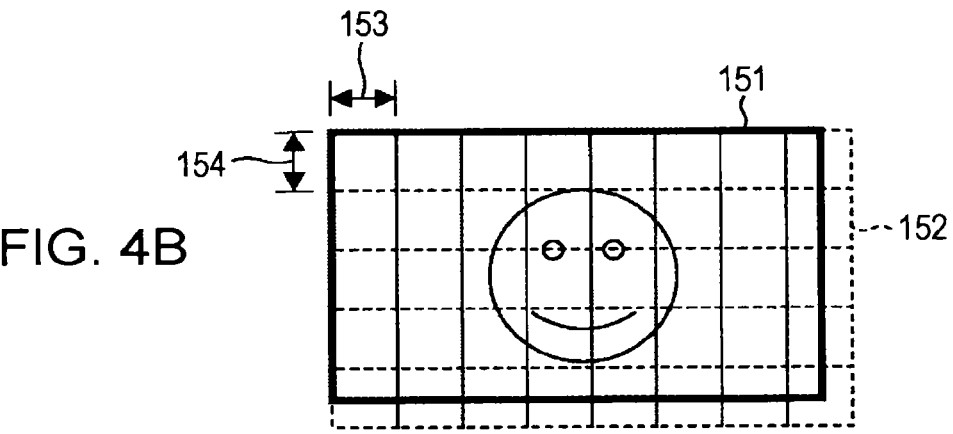

Here, the ALF block and the filter block flag will be described. FIGS. 4A to 4C illustrate the ALF block and the filter block flag.

As described above, in the adaptive filter, the filter coefficient is set for each frame. That is, the optimal filtering is performed on a frame-by-frame basis. However, generally, the frame image is not uniform in its entirety and locally has various characteristics. For this reason, the optimal filter coefficient is locally different. Therefore, in the filtering using the filter coefficient determined for each frame as described above, the image quality may be improved in the entire frame but may be locally degraded on the contrary.

In this regard, a block-based adaptive loop filter (BALF) was conceived in which the filtering is not performed for the area where the image quality is locally degraded.

The frame 151 of FIG. 4A illustrates a decoding image after the deblock filtering. As shown in FIG. 4B, the block information creation unit 132 compactly arranges a plurality of ALF blocks 152, that are control blocks as a control unit of the adaptive filtering each of which is locally performed, on the entire area of the frame 151. While the area where the ALF blocks 152 are arranged may not be equal to the area of the frame 151, it includes at least the entire area of the frame. As a result, the area of the frame 151 is divided into the areas of each ALF block 152.

The block information creation unit 132 determines the vertical size (the bidirectional arrow 154) and the horizontal size (the bidirectional arrow 153) of the ALF block 152. The ALF block size may be designated for each slice using any one of, for example, 8×8, 16×16, 24×24, 32×32, 48×48, 64×64, 96×96, or 128×128 pixels. In addition, information for designating that ALF block size is referred to as a block size index.

If the block size is determined, the frame size is fixed. Thus, the number of ALF blocks per single frame is also determined.

As shown in FIG. 4C, the block information creation unit 132 establishes the filter block flag 155 for controlling whether or not the filtering is performed for each ALF block 152. For example, a filter block flag 155 is set to a value of "1" for the area where the image quality is improved by the adaptive filter, and the filter block flag 155 is set to a value of "0" for the area where the image quality is degraded by the adaptive filter. In the filter block flag 155, a value of "1" represents that the filtering is performed, and a value of "0" represents that the filter is not performed.

The adaptive filtering unit 113 controls the adaptive filtering based on the value of the filter block flag 155. For example, the adaptive filtering unit 113 performs the filtering for the area of the ALF block 152 where the filter block flag 155 is set to a value of "1", and does not perform the filtering for the area of the ALF block 152 where the filter block flag 155 is set to a value of "0".

In addition, the aforementioned block size index and the filter block flag may include the slice header of the image compression information and may be sent from the image encoding apparatus 100 to the image decoding apparatus. One or more filter block flags corresponding to the number of the ALF blocks may be included in the slice header, for example, in the order of a raster scanning.

Therefore, as the ALF block size decreases, the more accurate filter control can be made, so that the ALF filter may be operated more appropriately. However, as the ALF block size decreases, the bit amount of the filter block flag increases. That is, as the ALF block size decreases, the encoding efficiency of the image compression information decreases. As a result, there is a tradeoff relationship between performance of the adaptive filter and encoding efficiency of the image compression information.

The number of the ALF blocks can be calculated according to the following equation (1).

$$N_{ALFBLOCK} = \text{floor}((16 \times N_{MBw} + N_{SIZE} - 1)/N_{SIZE}) \times \text{floor}((16 \times N_{MBh} + N_{SIZE} - 1)/N_{SIZE}) \quad \text{[Equation 1]}$$

In the equation (1), NALFBLOCK denotes the number of the ALF blocks. In addition, NMBw denotes the number of macroblocks in the horizontal direction of the picture, and NMBh denotes the number of macroblocks in the vertical direction of the picture. Furthermore, NSIZE denotes the size of one side of the ALF block. In addition, floor[x] denotes a function for truncating digits under a decimal point to obtain an integer number.

Figure 5:
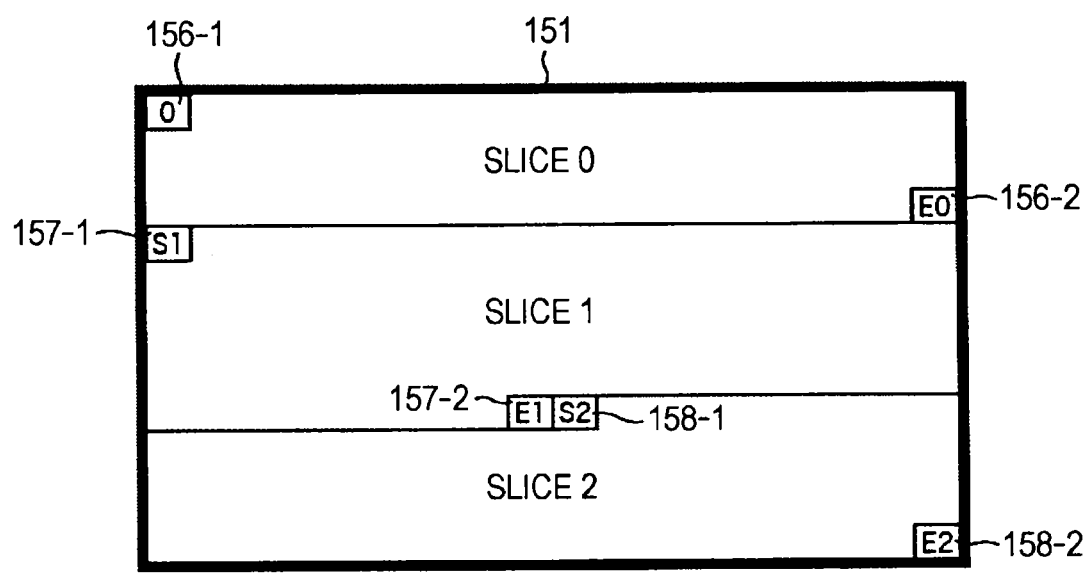
FIG. 5 illustrates an example of a multi-slice.

However, according to H.264/AVC, it is possible to divide a single frame into a plurality of slices and output the image compression information to each slice. FIG. 5 illustrates an example of a multi-slice. In the example of FIG. 5, the frame 151 is divided into three slices including a slice 0, a slice 1, and a slice 2.

The image encoding apparatus creates and outputs the image compression information with a shorter interval by outputting the image compression information in a more detailed slice unit than that of such a frame. That is, it is possible to allow the image decoding apparatus which decodes that image compression information to initiate decoding of the image compression information at an earlier time. In other words, it is possible to shorten the delay time after the image is input until the image is output through the encoding and decoding.

The reference document Takeshi. Chujoh, et al., "Block-based Adaptive Loop Filter" ITU-T SG16 Q6 VCEG Contribution, AI18, Germany, July, 2008' which describes the BALF does not disclose this multi-slice. That is, it does not describe that the ALF block is set for the entire frame. In order to create the filter block flag, it is necessary to provide the deblock-filtered decoding image. Therefore, if the filter block flag for the entire frame is created in a single time, it is necessary to stand by until the image is encoded for all the slices within the frame (until the deblock-filtered decoding image is obtained). In this case, since a delay time increases accordingly, there is no meaning to process the image on a slice-by-slice basis.

Therefore, in the case of the multi-slice, it is preferred to establish the ALF block for each slice and create the filter block flag in order to suppress the delay time from increasing. However, as described above, the ALF block is established for the entire frame. That is, the ALF block is established for the entire frame as described above. That is, the ALF block is established for the entire frame in each slice, and it is a concern that an unnecessary ALF block may be established in the areas other than the slice area.

Figure 6A:
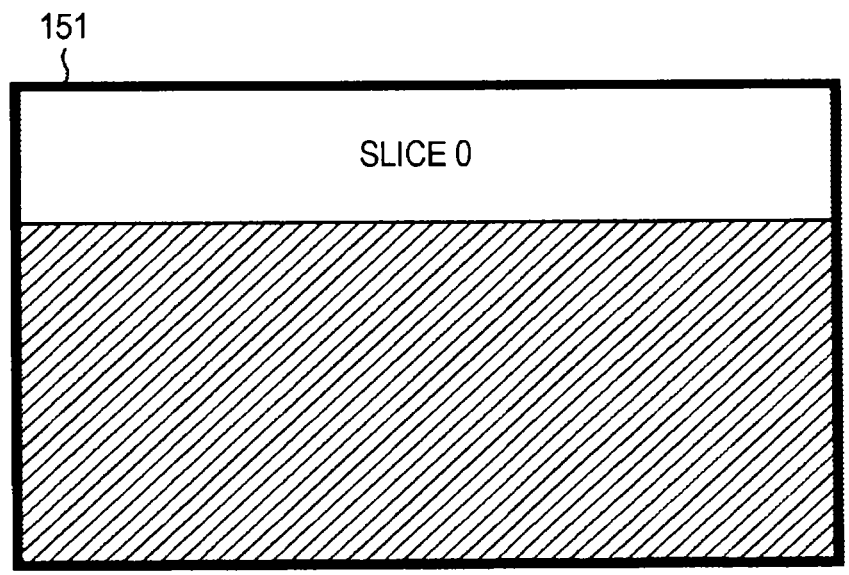
FIGS. 6A and 6B illustrate a processing for a slice 0.
Figure 6B:
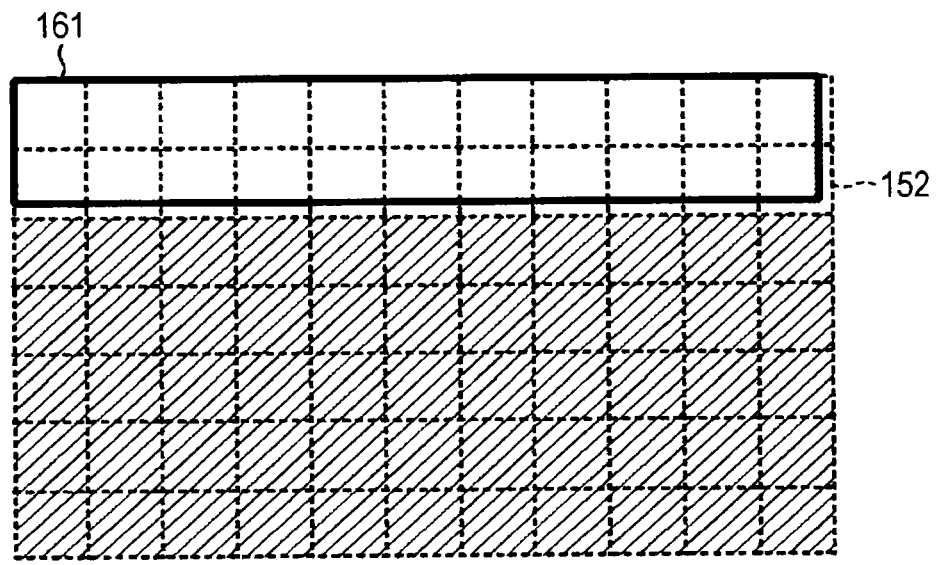

For example, in FIG. 5, when the slice 0 is processed as shown in FIG. 6A, the ALF block 152 for the entire frame 151 is established for the area of the slice 0 represented by the border line 161 as shown in FIG. 6B.

Figure 7A:
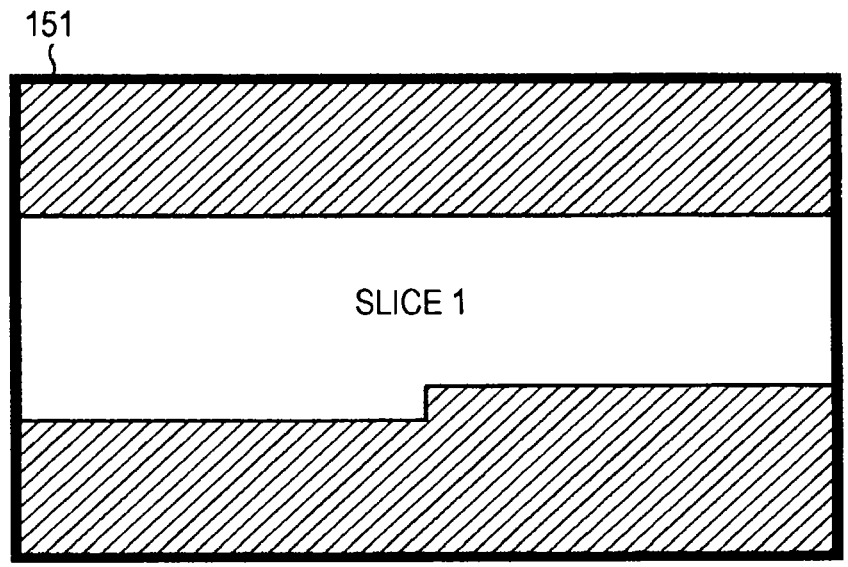
FIGS. 7A and 7B illustrate a processing for a slice 1.
Figure 7B:
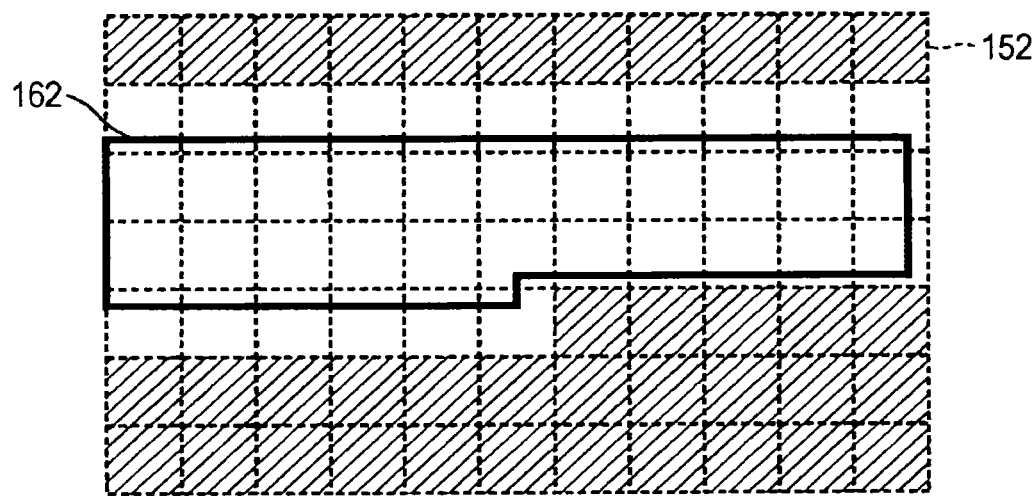

Similarly, for example, in the example of FIG. 5, when the slice 1 is processed as shown in FIG. 7A, the ALF block 152 for the entire frame 151 is established for the area of the slice 1 represented by the border line 162 as shown in FIG. 7B.

The ALF block 152 hatched in FIGS. 6B and 7B is a block out of the area of the slice 0 or 1 and also a block unnecessary to process the area of the slice 0 or 1.

As described above, the filter block flag 155 is established in each ALF block. That is, in the case of the multi-slice, an unnecessary filter block flag is created, and the data amount of the image compression information increases, so that the encoding efficiency may be degraded.

In this regard, the block information creation unit 132 of the control information creation unit 112 of FIG. 3 creates the filter block flag and the ALF block including the processing-target slice area in order to suppress degradation of the encoding efficiency.

Figure 8A:
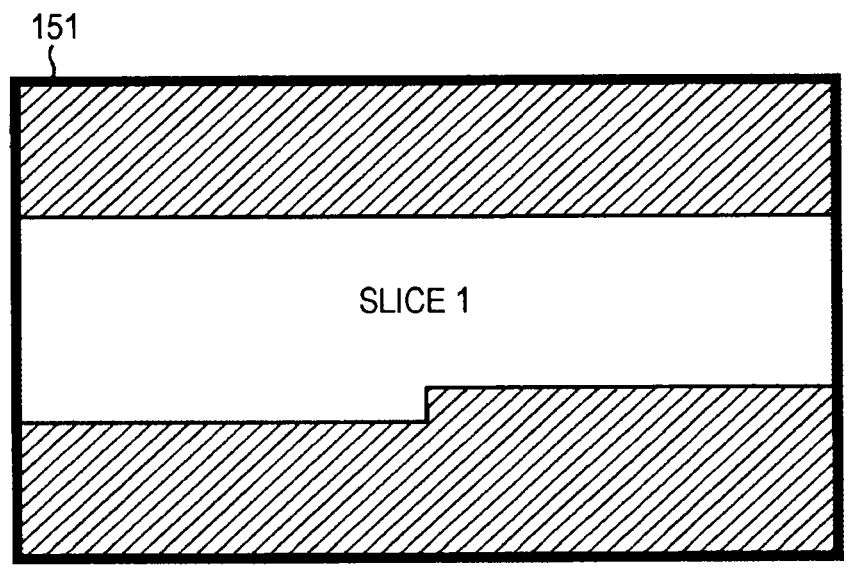
FIGS. 8A and 8B illustrate a processing for a slice 1 according to an embodiment of the invention.
Figure 8B:
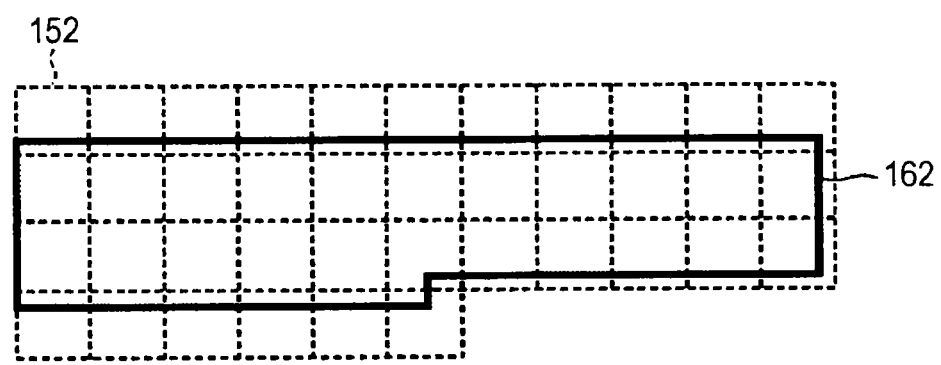

For example, in the example of FIG. 5, when the slice 1 is processed as shown in FIG. 8A, the block information creation unit 132 establishes the ALF block 152 including the area of the slice 1 represented by the border line 162 as shown in FIG. 8B and creates the filter block flag only for this ALF block 152.

As a result, only the filter block flag demanded by each slice is added to the image compression information. Therefore, in comparison with the case where the filter block flag of the entire frame is created for each slice as described above, the bit amount of the filter block flag is reduced, and degradation of the encoding efficiency is suppressed. In addition, since the image compression information including the control information is created for each slice, the image decoding apparatus can initiate the image decoding process on a slice-by-slice basis. Therefore, in comparison with the case where the filter block flag is created for each frame, it is possible to suppress the delay time from increasing.

Returning to FIG. 3, the block information creation unit 132 includes a processing-target slice area specifying unit 141, an ALF block setting unit 142, a processing-target ALF block area specifying unit 143, a determination unit 144, and a filter block flag creation unit 145.

The processing-target slice area specifying unit 141 specifies the location of the processing-target slice area supplied as the decoding image in the entire frame.

The ALF block setting unit 142 determines the ALF block size and sets the ALF block 152 for the entire frame. Since the size of the entire frame area is previously determined, the ALF block setting unit 142 can specify the number of the ALF blocks of the entire frame based on the determined block size.

The processing-target ALF block area specifying unit 143 selects the processing-target ALF block one by one from the ALF block 152 set by the ALF block setting unit 142 and specifies the location of the selected processing-target ALF block area.

The determination unit 144 determines whether or not the processing-target ALF block area includes the processing-target slice area. The filter block flag creation unit 145 creates the filter block flag of the ALF block for which the determination unit 144 determines that the processing-target slice area is included. The filter block flag creation unit 145 performs the adaptive filtering for the processing-target ALF block area using the filter coefficient calculated by the filter coefficient calculation unit 131 and determines the value of filter block flag based on whether or not the image quality has been improved after the filtering.

The filter block flag creation unit 145 outputs the control information such as the filter block flag or the ALF block size.

Figure 9:
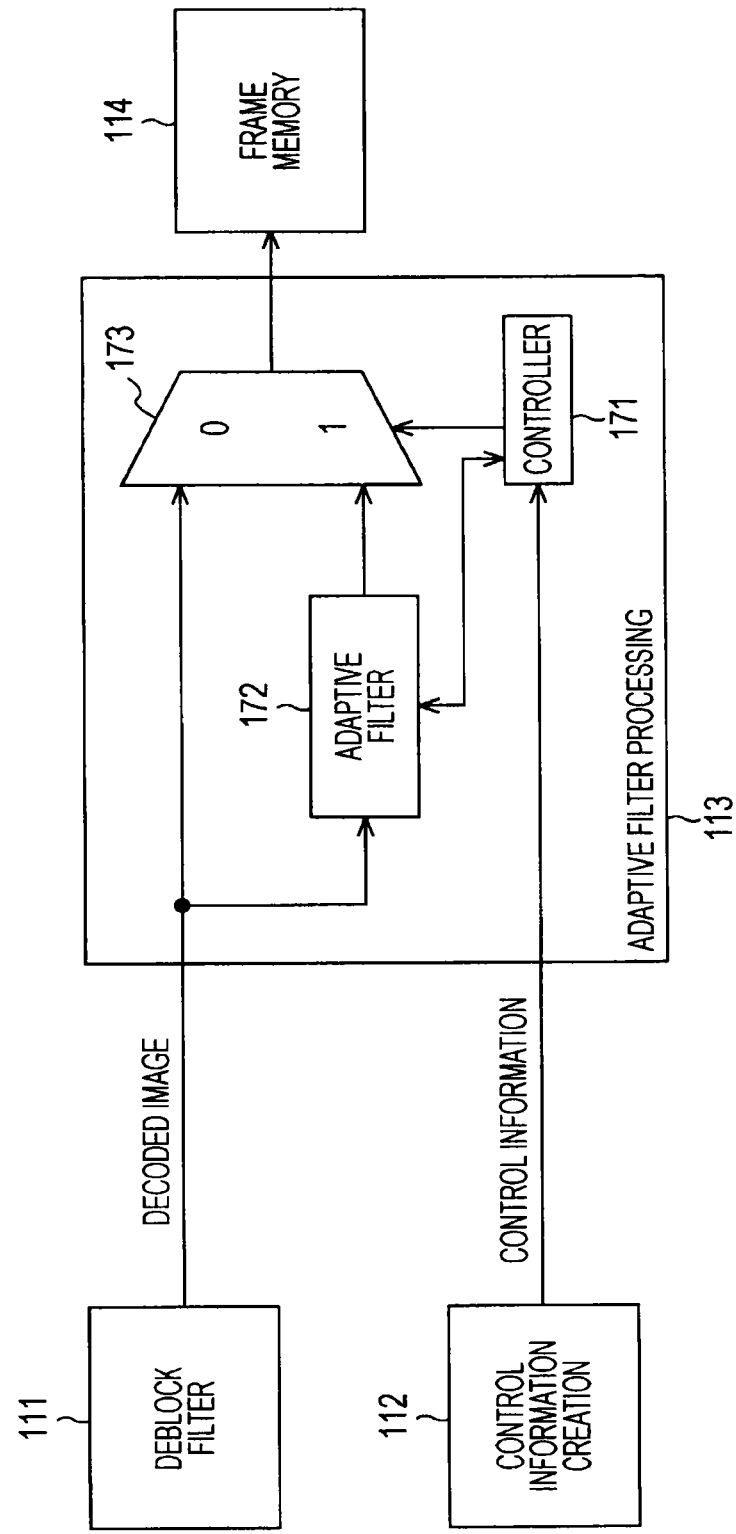
FIG. 9 is a block diagram illustrating an example of a main configuration of an adaptive filtering unit.

FIG. 9 is a block diagram illustrating an example of a main configuration of the adaptive filtering unit 113 of FIG. 1.

The adaptive filtering unit 113 performs filtering for the decoding image supplied from the deblock filter 111 using the control information supplied from the control information creation unit 112.

As shown in FIG. 9, the adaptive filtering unit 113 includes a controller 171, an adaptive filter 172, and a selector 173.

The controller 171 performs control for the adaptive filter 172 and the selector 173. For example, the controller 171 obtains control information from the control information creation unit 112. In addition, the controller 171 supplies the filter coefficient included in the obtained control information to the adaptive filter 172 and sets it. Furthermore, the controller 171 specifies the location of the ALF block area to be processed based on the ALF block size included in the control information. In addition, the controller 171 performs control for the adaptive filter 172 based on the value of the filter block flag included in the control information to perform filtering for each ALF block area if necessary and, at the same time, performs control for the operation of the selector 173.

The adaptive filter 172 performs filtering for the area specified by the controller 171 as the processing target ALF block in the decoding image supplied from the deblock filter 111 using the filter coefficient set by the controller 171. The adaptive filter 172 supplies the filtering result to the selector 173.

The selector 173 selects any one of the decoding image (the decoding image not subjected to the adaptive filtering) controlled by the controller 171 and supplied from the deblock filter 111 and the decoding image (the decoding image subjected to the adaptive filtering) supplied from the adaptive filter 172, supplies it to the frame memory 114, and accumulates it as a reference image.

That is, the adaptive filtering unit 113 performs filtering only for the area where the filtering is performed by the filter block flag (the area determined that it is possible to improve the image quality by the filtering) of the decoding image supplied from the deblock filter 111.

Process Flow

Next, a process flow using each unit described above will be described. Initially, the process flow of the encoding performed by the image encoding apparatus 100 will be described with reference to the flowchart of FIG. 10.

In step S101, the A/D conversion unit 101 performs A/D conversion for the input image. In step S102, the picture sorting buffer 102 stores the A/D converted image and performs sorting from the sequence of displaying each picture to the encoding sequence.

In step S103, the computation unit 103 computes a difference between the predicted image and the sorted image in the process of step S102. The predicted image is supplied to the computation unit 103 through the prediction image selection unit 118 from the motion compensation unit 116 in the case of the inter-prediction or from the intra-prediction unit 115 in the case of the intra-prediction.

The difference data has a smaller data amount in comparison with the original image data. Therefore, it is possible to reduce the data amount in comparison with the case where the image is encoded without change.

In step S104, the orthogonal conversion unit 104 performs orthogonal conversion for the difference information created by step S103. Specifically, the conversion coefficient is output by the orthogonal conversion such as a discrete cosine transform or Karhunen and Loeve transform. In step S105, the quantization unit 105 quantizes the conversion coefficient. In this quantization, the rate is controlled as described in the process of step S119 described below.

The quantized difference information as described above is locally decoded as described below. That is, in step S106, the inverse quantization unit 108 performs inverse quantization for the conversion coefficient quantized by the quantization unit 105 using the characteristic corresponding to the characteristic of the quantization unit 105. In step S107, the inverse orthogonal conversion unit 109 performs inverse orthogonal conversion for the conversion coefficient inversely-quantized by the inverse quantization unit 108 using the characteristic corresponding to the characteristic of the orthogonal conversion unit 104.

In step S108, the computation unit 110 adds the predicted image input through the prediction image selection unit 118 to the locally-decoded difference information to create the locally-decoded image (the image corresponding to the input to the computation unit 103). In step S109, the deblock filter 111 performs filtering for the image output by the computation unit 110. As a result, the block distortion is removed.

As the aforementioned process is performed for a single slice, the control information creation unit 112 creates control information used in the adaptive filtering in step S110. Details of the control information creation process will be described below in detail.

As control information such as the ALF block size and the filter block flag is created through the process of step S110, the adaptive filtering unit 113 performs adaptive filtering for the deblock-filtered decoding image in step S109 using the control information in step S111. Details of this adaptive filtering will be described below.

In step S112, the frame memory 114 stores the image subjected to the adaptive filtering in step S111.

In step S113, the intra-prediction unit 115 performs the intra-prediction process of the intra-prediction mode. In step S114, the motion prediction unit 117, and the motion compensation unit 116 performs the inter-motion prediction/compensation processing of the inter-prediction mode.

In step S115, the prediction image selection unit 118 selects any one of the prediction image created by the intra-prediction processing or the prediction image created by the inter-motion prediction/compensation processing depending on the prediction mode of the processing-target frame. The prediction image selection unit 118 supplies the selected prediction image to the computation unit 103 and the computation unit 110. This prediction image is used in operations of steps S103 and S108 as described above.

In step S116, the reversible encoder 106 encodes the quantized conversion coefficient output from the quantization unit 105. That is, the difference image is compressed using a reversible encoding such as a variable length encoding encoding or an arithmetic encoding. In this case, the reversible encoder 106 also encodes the control information created in step S110, the intra-prediction mode information of the intra-prediction process in step S113, the inter-prediction mode of the inter-motion prediction/compensation process of step S114, or the like.

In step S117, the reversible encoder 106 embeds (describes) the metadata such as the encoded control information into a slice header. This metadata is read and used when the image is decoded. By including (multiplexing) the metadata necessary to perform the decoding process in the slice header as described above, it is possible to perform the decoding process using a more accurate unit than a frame unit and suppress the delay time from increasing.

In step S118, the accumulation buffer 107 accumulates the difference image as the compression image. The compression image accumulated in the accumulation buffer 107 is appropriately read and transmitted to the decoding side through a transmission line.

In step S119, the rate control unit 119 performs control for the rate of the quantization operation of the quantization unit 105 so as not to generate overflow or underflow based on the compression image accumulated in the accumulation buffer 107.

Figure 10:
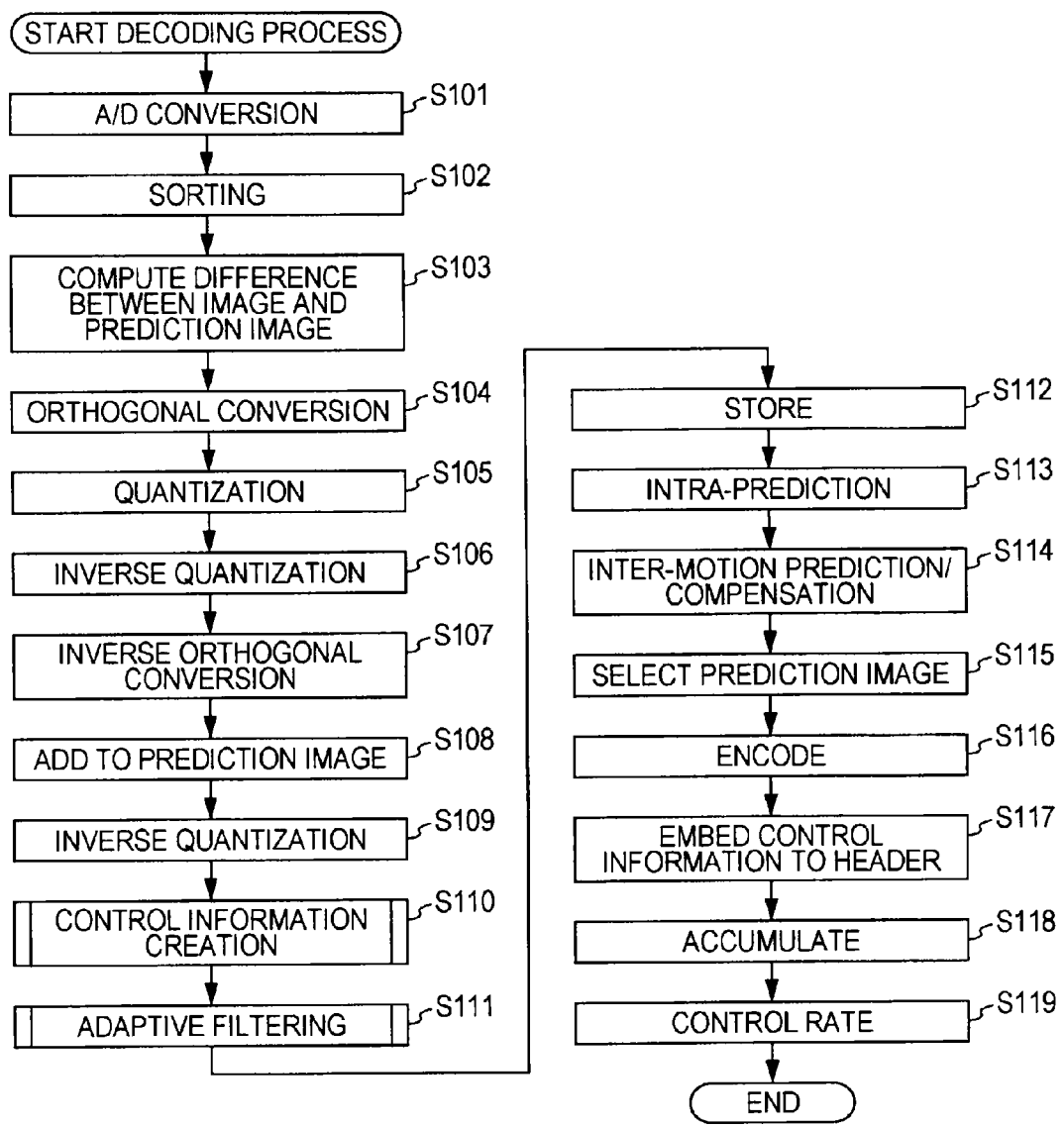
FIG. 10 is a flowchart illustrating an example of an encoding process flow.

Next, in step S110 of FIG. 10, an example of the control information creation process flow performed by the control information creation unit 112 will be described with reference to the flowchart of FIG. 11.

As the control information creation process is initiated, the filter coefficient calculation unit 131 of the control information creation unit 112 calculates the filter coefficient using the input image supplied from the picture sorting buffer 102 and the deblock-filtered decoding image supplied from the deblock filter 111 in step S131. For example, the filter coefficient calculation unit 131 determines a value of the filter coefficient such that a residual difference between the input image and the decoding image becomes minimum.

As the filter coefficient is calculated, the block information creation unit 132 performs creation of the block information including the ALF block size or the filter block flag in step S132. Details of the block information creation process will be described below. As the block information is created, the process returns to step S110 of FIG. 10, and the process subsequent to step S111 is executed.

In addition, the filter coefficient calculated in step S131 may be obtained on a frame-by-frame basis. In this case, the process of step S131 may be performed only for a predetermined slice within a frame (such as a slice having a predetermined value of an identification number, for example, 0 within the frame or a slice initially processed within the frame or the like), and the value may be similarly used in other slices. In addition, any image can be used to calculate the filter coefficient. For example, the filter coefficient may be calculated based on a past frame image.

Next, an example of the block information creation process flow executed in step S132 of FIG. 11 will be described with reference to the flowchart of FIG. 12.

As the block information creation process is initiated, the processing-target slice area specifying unit 141 specifies the processing-target slice area in step S151.

The corresponding processing-target slice area may be recognized by identifying a macroblock included in the corresponding slice and identifying a pixel included in that macroblock. The processing-target slice area specifying unit 141 obtains the leading end macroblock address of the corresponding slice from the slice header.

Here, the leading end macroblock address refers to a number attached to the macroblock starting from the upper left of the image in the order of a raster scanning. As shown in FIG. 5, the address of the upper left macroblock within the image (the frame 151) is set to 0. Since the slice 0 is initiated from the upper left of the frame 151, the macroblock address of the leading end macroblock 156-1 of the slice 0 is 0. In this order, the macroblock address of the final macroblock 156-2 of the slice 0 is set to E0. In addition, similar to this slice 0, the macroblock address of the leading end macroblock 157-1 of the slice 1 is set to S1, and the macroblock address of the final macroblock 157-2 is set to E1. Furthermore, the macroblock address of the leading end macroblock 158-1 of the slice 2 is set to S2, and the macroblock address of the final macroblock 158-2 is set to E2.

As the corresponding slice is decoded, the macroblock address is incremented by 1 whenever the decoding process is completed for a single macroblock, and finally, to the final macroblock of the corresponding slice. In the final macroblock of the slice, a flag is set. As a result, it is possible to recognize all of the macroblock addresses of the corresponding slice, i.e., from the leading end macroblock address to the final macroblock address.

However, the image size of a single frame is represented by the number of macroblocks in the SPS (sequence parameter set) of the AVC stream (image compression information). The parameter pic_height_in_map_units_minus1 denotes the number of macroblocks in a vertical direction of the image. The parameter pic_width_in_mbs_minus1 denotes the number of macroblocks in a horizontal direction of the image.

Therefore, the location of the macroblock can be represented by the following equations (2) and (3) from the macroblock address.

$$mbx = \text{macro block address } 0012C694ic\_width\_in\_mbs\_minus1 \qquad (2)$$

$$mby = \text{floor}[\text{macro block address}/pic\_width\_in\_mbs\_minus1] \qquad (3)$$

In the equations (2) and (3), the parameter mbx represents where the macroblock is located from the leftmost side, and the parameter mby represents where the macroblock is located from the uppermost side. In addition, the operator floor[z] represents an operation of truncating digits under the decimal point to make an integer number. The parameter A represents residual numbers obtained by dividing the number A by the number B.

Assuming that the macroblock size is determined as 16×16 pixels, the location in the vertical and horizontal directions of the upper left pixel of the macroblock is set to (16×mbx, 16×mby). That macroblock includes 16 pixels in the lower direction and 16 pixels in the rightward direction with respect to the location of the upper left pixel. As a result, all pixels of the corresponding slice can be recognized. That is, the processing-target slice area is specified.

Figure 12:
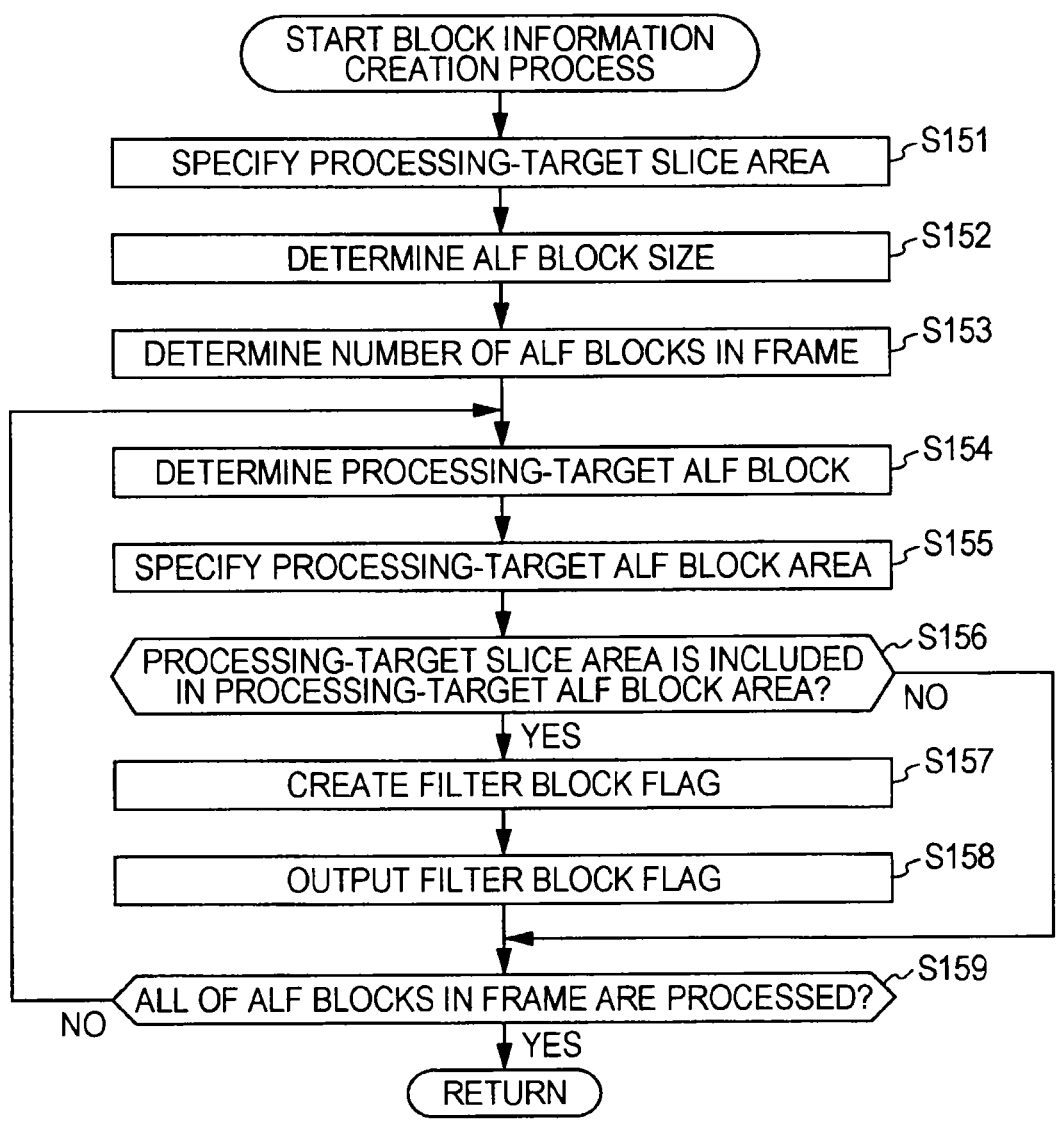
FIG. 12 is a flowchart illustrating an example of a block information creation process flow.

In step S152 of FIG. 12, the ALF block setting unit 142 determines the ALF block size. In step S153, the ALF block setting unit 142 determines the number of the ALF blocks within the frame. Since the frame image size is previously determined, as the ALF block size is determined, it is possible to calculate the number of the ALF blocks (the number of ALF blocks within the frame) necessary to arrange the ALF blocks on the entire area using the upper left corner of the frame as an origin. Since the setup values of the vertical and horizontal sizes (the number of pixels) of the ALF block are previously provided, the ALF block setting unit 142 determines the ALF block size and the number of ALF blocks based on the setup values and arranges the ALF blocks in the decoding image.

In addition, the number of the ALF blocks is calculated based on the following equations (4) and (5).

$$num\_alf\_block\_x = \text{floor}[(16 \times (pic\_width\_in\_mbs\_minus1+1)+(alf\_block\_size-1))/alf\_block\_size] \qquad (4)$$

$$num\_alf\_block\_y = \text{floor}[(16 \times (pic\_height\_in\_map\_units\_minus1+1)+(alf\_block\_size-1))/alf\_block\_size] \qquad (5)$$

In the equations (4) and (5), the parameters num_alf_block_x and num_alf_block_y represent the horizontal and vertical numbers, respectively, of the ALF block included in the image. The parameter alf_block_size represents the size of a single side of the ALF block. Here, for the purpose of simple descriptions, it is assumed that the ALF block is cubic. Needless to say, the horizontal and vertical sizes of the ALF block may be different from each other.

In step S154, the processing-target ALF block area specifying unit 143 determines the processing-target ALF block. In step S155, the processing-target ALF block area specifying unit 143 specifies the processing-target ALF block area.

The location of the ith ALF block is represented in the following equations (6) and (7).

$$alf\_block\_x = i(num\_alf\_block\_x-1) \qquad (6)$$

$$alf\_block\_y = \text{floor}[i/(num\_alf\_block\_x-1)] \qquad (7)$$

In the equations (6) and (7), the parameters alf_block_x and alf_block_y represent where the ith ALF block is located in the horizontal and vertical directions, respectively. The location of the upper left pixel of the ith ALF block can be obtained by multiplying each value of the parameters alf_block_x and aof_block_y by the parameter alf_block_size. That is, the location of the horizontal direction is set to 16×alf_block_x, and the location of the vertical direction is set to 16×alf_block_y. Therefore, the ith ALF block area occupies a range of alf_block_size×alf_block_size with respect to the upper left pixel.

In step S156, the determination unit 144 determines whether or not the processing-target slice area is included in the processing-target ALF block specified as described above.

If it is determined that the processing-target slice area is included in the processing-target ALF block area, the process advances to step S157. In step S157, the filter block flag creation unit 145 creates the filter block flag for that ALF block because the processing-target ALF block is the ALF block demanded by the processing-target slice. In step S158, the filter block flag creation unit 145 outputs the created filter block flag.

If the process of step S158 is terminated, the process advances to step S159. In addition, in step S156, if it is determined that the processing-target slice area is not included in the processing-target ALF block area, that ALF block is not necessary for the processing-target slice, and the process advances to step S159.

In step S159, the processing-target ALF block area specifying unit 143 determines whether or not all of the ALF blocks within the frame have been processed. If it is determined that all of the ALF blocks are not processed, the process returns to step S154, and the subsequent process is iterated by setting the new ALF block as the processing target. The processing-target ALF block area specifying unit 143 selects an ALF block from the ALF block group arranged in the entire frame area one-by-one as the processing-target ALF block in the order of the raster scanning starting from the upper left ALF block when this loop processing is iterated.

Figure 11:
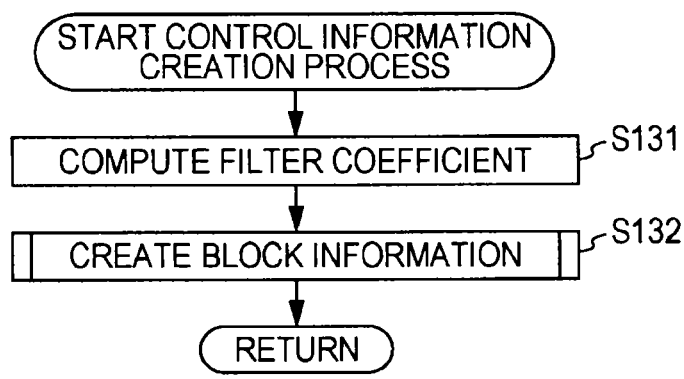
FIG. 11 is a flowchart illustrating an example of a control information creation process flow.

In addition, in step S159, if it is determined that all of the ALF blocks within the frame are processed, the block information creation process is terminated, and the process returns to step S132 of FIG. 11. As the control information creation process is terminated, the process returns to step S110 of FIG. 10, and the process subsequent to step S111 is executed.

In addition, while, in the aforementioned descriptions, the upper left point of the frame is set to an origin when the ALF blocks are arranged in the entire frame image area, the location of this origin may be arbitrarily set. For example, the location of the origin may be set to the lower left, the lower right, the upper right, or the center point. However, the location of the origin and how to arrange the ALF blocks are necessary to be previously set so as to be common between the encoding and the decoding.

While in the aforementioned descriptions, the order of selecting the processing-target ALF blocks is set to the raster scanning order starting from the upper left point, the selection order and the starting location may be arbitrarily set.

Figure 13:
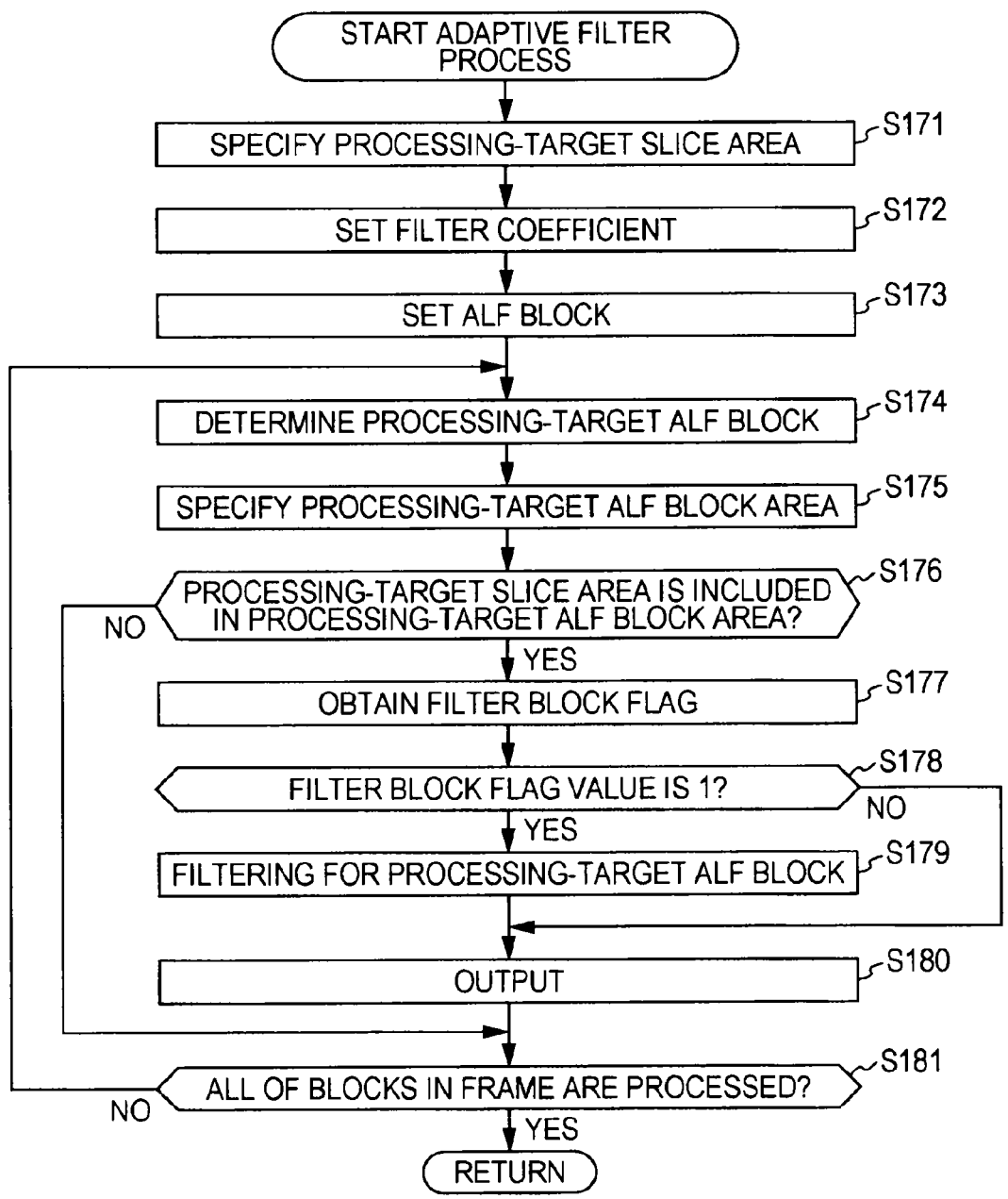
FIG. 13 is a flowchart illustrating an example of an adaptive filtering process flow.

Next, an example of the adaptive filter process flow executed in step S111 of FIG. 10 will be described with reference to the flowchart of FIG. 13.

As the adaptive filtering is initiated, the decoding image of the processing-target slice is supplied to the adaptive filter 172 and the selector 173. In step S171, the controller 171 specifies that processing-target slice area. Similar to the process of step S151 of FIG. 12, the controller 171 obtains the leading end macroblock address of the corresponding slice of the slice header, further detects the flag representing the final macroblock, and specifies the area from the leading end macroblock address to the final macroblock address as the processing target slice area.

In step S172, the controller 171 obtains the filter coefficient created by the control information creation unit 112 and sets that filter coefficient in the adaptive filter 172. In step S173, the controller 171 obtains the ALF block size determined by the control information creation unit 112 and sets (arranges) the ALF blocks having that ALF block size in the entire frame area.

In step S174, similar to step S154 of FIG. 12, the controller 171 determines one of the unprocessed ALF blocks of the ALF block group established as described above as the processing-target ALF block. This ALF block selection order is previously determined and common to the selection order of the control information creation unit 112.

In step S175, similar to step S155 of FIG. 12, the controller 171 specifies the determined processing-target ALF block area.

In step S176, similar to step S156 of FIG. 12, the controller 171 determines whether or not the processing-target slice area is included in the processing-target ALF block area. If it is determined that the processing-target slice area is included, the process advances to step S177.

In step S177, the controller 171 obtains the filter block flag of the processing-target ALF block created in the control information creation unit 112. Since the control information creation unit 112 creates the filter block flag as described above, the filter block flag is supplied only to the ALF block including the processing-target slice area in practice. Since the processing order of the ALF block is common to the control information creation unit 112, the filter block flag is supplied in the processing order of the ALF block. Therefore, the controller 171 can obtain (employ) the filter block flag of the processing-target ALF block by obtaining (employing) the filter block flag in that supply order.

In addition, the timing of supplying the filter block flag and the timing of obtaining the filter block flag using the controller 171 may not be the same. That is, the controller 171 may temporarily store the filter block flag supplied from the control information creation unit 112, for example, in an internal buffer or the like and read the filter block flag from that buffer in the process of step S177. Even in that case, the controller 171 can obtain the filter block flag of the processing-target ALF block just by making the order of reading the filter block flag to be the same as the order of supplying the filter block flag from the control information creation unit 112, i.e., the accumulation order in the buffer.

In step S178, the controller 171 determines whether or not the value of the filter block flag is 1. If the value of the filter block flag is 1, and it is instructed that the filtering is performed for the processing-target ALF block area, the process advances to step S179. In step S179, the adaptive filter 172 is controlled by the controller 171, and the filtering is performed for the processing-target ALF block. If the process of step S179 is terminated, the process advances to step S180. In this case, the selector 173 is controlled by the controller 171 in step S180, and the output of the adaptive filter 172 is selected and output to the frame memory 114. In other words, (a part of the area of) the decoding image subjected to the filtering is accumulated in the frame memory 114. As the process of step S180 is terminated, the process advances to step S181.

In addition, in step S178, if the value of the filter block flag is 0, and it is instructed that the filtering is not performed for the processing-target ALF block area, the process of step S179 is omitted, and the process advances to step S180. In this case, in step S180, the selector 173 is controlled by the controller 171, and the output of the deblock filter 111 is selected and output to the frame memory 114. That is, (a part of the area of) the decoding image not subjected to the filtering is accumulated in the frame memory 114. As the process of step S180 is terminated, the process advances to step S181.

In addition, in step S176, if it is determined that the processing-target slice area is not included in the processing-target ALF block area, the processing-target ALF block is an ALF block having no relationship with the processing-target slice. Therefore, the process of steps S177 to S180 is omitted, and the process advances to step S181.

In step S181, the controller 171 determines whether or not all of the ALF blocks within the frame are processed. If it is determined that there is any unprocessed ALF block, the process returns to step S174, and the subsequent process is iterated for a new processing-target ALF block. The controller 171 selects an ALF block from the ALF block group arranged in the entire frame area one-by-one as the processing-target ALF block in the order of the raster scanning starting from the upper left ALF block when this loop processing is iterated.

In addition, in step S181, if it is determined that all of the ALF blocks within the frame are processed, the adaptive filtering is terminated. The process returns to step S111 of FIG. 10, and the process subsequent to step S112 is iterated.

By performing the adaptive filtering as described above, the adaptive filtering unit 113 can appropriately perform the filtering for the processing-target slice, demanded by the processing-target slice of a plurality of slices formed in the frame, based on the filter block flag of a part of the ALF block within the frame. As a result, the adaptive filtering unit 113 can reduce block distortion or quantization distortion that is not handled by the deblock filter of the processing-target slice.

How to arrange the ALF blocks is previously determined. Therefore, in the state that the ALF blocks are arranged in the entire frame area, it is possible to readily obtain the locations of each ALF block from the ALF block size. Therefore, when the filter block flag is created for all of the ALF blocks within the frame like the related art, it is possible to readily specify the location of the area corresponding to each filter block flag.

However, for example, in the case of the multi-slice having a plurality of slices in the frame, it is conceived that the filtering is performed for the processing-target slice using the filter block flags of a part of the ALF blocks within the frame. In this case, depending on the location of the processing-target slice area (i.e., the processing-target slice is selected from any one of a plurality of slices within the frame), the location of the area corresponding to the used filter block flag is different.

However, according to the method in the related art, the location of the filter block flag or the processing-target slice is not specified. Therefore, control by the filter block flag created in the control information creation unit 112 may not be appropriately operated, and the adaptive filtering may not be appropriately performed.

As described above, since the adaptive filtering unit 113 specifies the location of the processing-target slice area which is a part of the area within the frame and the location of the area corresponding to the filter block flag of a part of the ALF block within the frame, it is possible to appropriately perform the adaptive filtering. That is, since the filter block flag that does not affect the processing target slice of the ALF block which does not include the processing-target slice area is not necessary, the adaptive filtering unit 113 can suppress degradation of the encoding efficiency of the image compression information.

In addition, since the control information creation unit 112 creates the filter block flag only for the ALF block which includes the processing-target slice area as described above, it is possible to suppress creation of an unnecessary filter block flag and suppress degradation of the encoding efficiency of the image compression information.

In addition, the adaptive filtering unit 113 can readily specify the location of the processing-target slice area and the location of the area corresponding to the filter block flag by using the same method as that of the control information creation unit 112 as described above.

In addition, since the reversible encoder 106 adds the block information including the ALF block size and the filter block flag to the encoding data (e.g., embedding it into the slice header), the image decoding apparatus which decodes those encoding data can also perform the filtering based on the block information similar to that of the adaptive filtering unit 113.

Here, "add" means that the block information is correlated with the encoding data in any type. For example, the block information may be described as the syntax of the encoding data or may be described as user data. In addition, the block information may be linked with the encoding data as metadata. That is, "add" includes "embed", "describe", "multiplex", "link", or the like.

By performing the encoding accompanying with the block information creation process or the adaptive filtering as described above, only those in which the filter block flag is necessary can be included in the image compression information. Therefore, the image encoding apparatus 100 can suppress degradation of the encoding efficiency by locally controlling the filtering during the encoding or the decoding. For example, even when each frame of the image is divided into a plurality of slices, and the encoding using the adaptive filter is performed for each slice and output, the image encoding apparatus 100 can suppress degradation of the encoding efficiency.

2. Second Embodiment

Device Configuration

Figure 14:
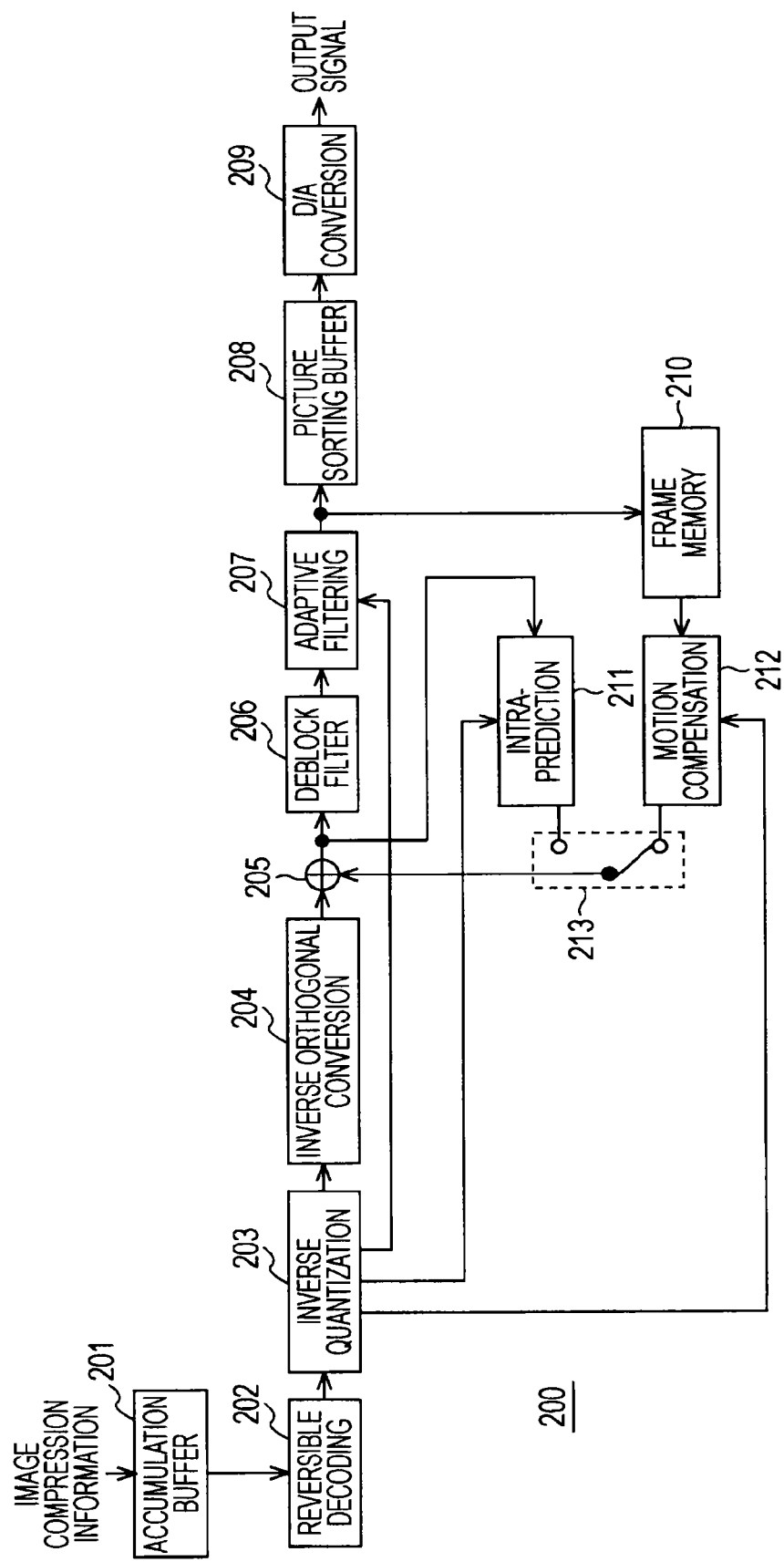
FIG. 14 is a block diagram illustrating an example of a main configuration of an image decoding apparatus according to an embodiment of the invention.

Next, an image decoding apparatus corresponding to the image encoding apparatus 100 of the first embodiment of the invention will be described. FIG. 14 is a block diagram illustrating a configuration example of the image decoding apparatus as an image processing apparatus according to an embodiment of the invention.

The image decoding apparatus 200 decodes the image compression information output from the image encoding apparatus 100 to create a decoding image.

The image decoding apparatus 200 includes an accumulation buffer 201, a reversible decoding unit 202, an inverse quantization unit 203, an inverse orthogonal conversion unit 204, a computation unit 205, and a deblock filter 206. In addition, the image decoding apparatus 200 has an adaptive filtering unit 207. Furthermore, the decoding apparatus 200 has a picture sorting buffer 208 and a D/A (Digital-to-Analog 1) conversion unit 209. Still furthermore, the image decoding apparatus 200 has a frame memory 210, an intra-prediction unit 211, a motion compensation unit 212, and a selector 213.

The accumulation buffer 201 accumulates transmitted image compression information. The reversible decoding unit 202 decodes the information encoded by the reversible encoder 106 of FIG. 1, supplied from the accumulation buffer 201, using a decoding scheme corresponding to the encoding scheme of the reversible encoder 106.

When the corresponding macroblock is intra-coded, the reversible decoding unit 202 decodes the intra-prediction mode information stored in the header of the image compression information and transmits the information to the intra-prediction unit 211. In addition, when the corresponding macroblock is inter-coded, the reversible decoding unit 202 decodes the motion vector information stored in the header of the image compression information and transmits the information to the motion compensation unit 212.

In addition, the reversible decoding unit 202 extracts control information (control information created by the control information creation unit 112) for the adaptive filter from the slice header of the image compression information, decodes it, and supplies that information to the adaptive filtering unit 207.

The inverse quantization unit 203 performs inverse quantization for the image decoded by the reversible decoding unit 202 using a scheme corresponding to the quantization scheme of the quantization unit 105 of FIG. 1. The inverse orthogonal conversion unit 204 performs inverse orthogonal conversion for the output of the inverse quantization unit 203 using a scheme corresponding to the orthogonal conversion scheme of the orthogonal conversion unit 104 of FIG. 1.

The computation unit 205 adds the prediction image supplied from the selector 213 to the difference information subjected to the inverse orthogonal conversion to create a decoding image. The deblock filter 206 removes block distortion of the decoding image created by such an addition.

The adaptive filtering unit 207 performs filtering for the image supplied from the deblock filter 206 based on the information such as the ALF block size, the filter block flag, and the filter coefficient included in the control information supplied from the reversible decoding unit 202. The adaptive filtering unit 207 performs the same adaptive filtering as that of the adaptive filtering unit 113 of FIG. 1. As a result, the adaptive filtering unit 207 can reduce block distortion or quantization distortion that was not removed by the deblock filter 206.

The adaptive filtering unit 207 supplies the image after the filtering to the frame memory 210, accumulates the image as the reference image information, and outputs it to the picture sorting buffer 208.

The picture sorting buffer 208 performs sorting for the image. That is, the sequence of the frames sorted in the encoding sequence of the picture sorting buffer 102 of FIG. 1 is sorted in the original display sequence. The D/A conversion unit 209 performs D/A conversion for the image supplied from the picture sorting buffer 208 and outputs it. For example, the D/A conversion unit 209 outputs the output signal obtained by the D/A conversion to a display unit (not shown) to display it.

When the corresponding frame is intra-coded, the intra-prediction unit 211 creates a prediction image based on the information supplied from the reversible decoding unit 202 and outputs the created prediction image to the selector 213.

When the corresponding frame is inter-coded, the motion compensation unit 212 performs a motion compensation process for the reference image information stored in the frame memory 210 based on the motion vector information supplied from the reversible decoding unit 202.

When the corresponding macroblock is intra-coded, the selector 213 is connected to the intra-prediction unit 211 and supplies the image supplied from the intra-prediction unit 211 as a prediction image to the computation unit 205. In addition, when the corresponding macroblock is inter-coded, the selector 213 is connected to the motion compensation unit 212 and supplies the image supplied from the motion compensation unit 212 as a prediction image to the computation unit 205.

Process Flow

Figure 15:
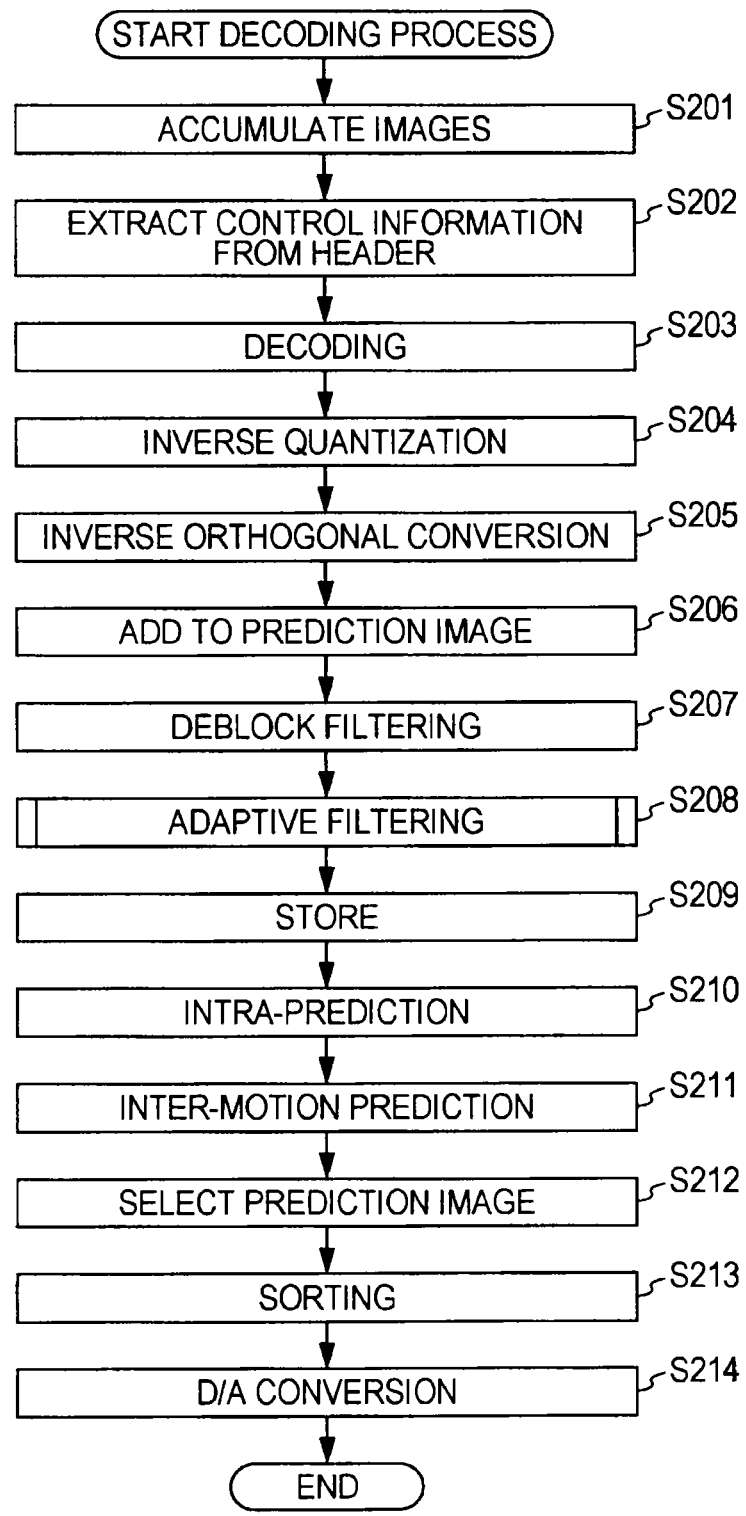
FIG. 15 is a flowchart illustrating an example of a decoding process flow.

An example of the decoding process flow executed by the image decoding apparatus 200 will be described with reference to the flowchart of FIG. 15.

In step S201, the accumulation buffer 210 accumulates the transmitted image. In step S202, the reversible decoding unit 202 decodes the compression image supplied from the accumulation buffer 201. That is, the I-picture, the P-picture, and the B-picture are encoded by the reversible encoder 106 of FIG. 1.

In this case, the motion vector information, the reference frame information, the prediction mode information (information representing the intra-prediction mode or the inter-prediction mode), or the like are also decoded.

That is, when the prediction mode information is intra-prediction mode information, the prediction mode information is supplied to the intra-prediction unit 211. When the prediction mode information is the inter-prediction mode information, the reference frame information and the motion vector information corresponding to the prediction mode information are supplied to the motion compensation unit 212.

Furthermore, the reversible decoding unit 202 extracts the control information for the adaptive filtering from the slice header of the image compression information in step S202 and decode it. The decoded control information is supplied to the adaptive filtering unit 207.

In step S204, the inverse quantization unit 203 performs inverse quantization for the conversion coefficient decoded in step S202 using the characteristic corresponding to the characteristic of the quantization unit 105 of FIG. 1. In step S205, the inverse orthogonal conversion unit 204 performs inverse orthogonal conversion for the conversion coefficient subjected to the inverse quantization in step S204 using the characteristic corresponding to the characteristic of the orthogonal conversion unit 104 of FIG. 1. As a result, difference information corresponding to the input of the orthogonal conversion unit 104 (the output of the computation unit 103) of FIG. 1 is decoded.

In step S206, the computation unit 205 adds the prediction image selected in step S212 described below to the difference information. As a result, the original image is decoded. In step S207, the deblock filter 206 performs filtering for the image output from the computation unit 205. As a result, block distortion is removed.

In step S208, the adaptive filtering unit 207 further performs adaptive filtering for the image subjected to the deblock filtering. This adaptive filtering is similar to the process performed by the adaptive filtering unit 113 of FIG. 1. That is, this adaptive filtering is performed in a similar way to that described with reference to the flowchart of FIG. 13 using the control information supplied from the reversible decoding unit 202. However, the control information supplied from the reversible decoding unit 202 is also created by the control information creation unit 112 of FIG. 1 and is substantially the same as the control information supplied from the control information creation unit 112 used by the adaptive filtering unit 113 of FIG. 1.

Through this adaptive filtering, it is possible to reduce block distortion or quantization distortion that was not removed by the deblock filtering.

In step S209, the frame memory 210 stores the image subjected to the filtering.

When the intra-prediction mode information is supplied, the intra-prediction unit 211 performs intra-prediction for the intra-prediction mode in step S210. In addition, when the inter-prediction mode information is supplied, the motion compensation unit 212 performs motion compensation for the inter-prediction mode in step S211.

In step S212, the selector 213 selects a prediction image. That is, the selector 213 selects any one of the prediction image created by the intra-prediction unit 211 or the prediction image created by the motion compensation unit 212 and supplies the selected prediction image to the computation unit 205.

For example, in the case of the intra-coded image, the selector 213 selects the prediction image created by the intra-prediction unit 211 and supplies it to the computation unit 205. In addition, in the case of the inter-coded image, the selector 213 selects the prediction image created by the motion compensation unit 212 and supplies it to the computation unit 205.

In step S213, the picture sorting buffer 208 performs sorting. That is, the frame sequence sorted for the encoding by the picture sorting buffer 102 of the image encoding apparatus 100 of FIG. 1 is sorted in the original display sequence.

In step S214, the D/A conversion unit 209 performs D/A conversion for the image from the picture sorting buffer 208. This image is output to a display unit (not shown) and displayed thereon.

As such, in the image decoding apparatus 200, the reversible decoding unit 202 extracts the control information supplied from the image encoding apparatus 100 and decodes it, and the adaptive filtering unit 207 performs adaptive filtering in a similar way to that of the adaptive filtering unit 113 of the image encoding apparatus 100 using such control information.

As described above, by performing the adaptive filtering, it is possible to allow the adaptive filtering unit 207 to appropriately perform filtering demanded by the processing-target slice of a plurality of slices formed in the frame based on the filter block flag of a part of the ALF block within the frame. As a result, the adaptive filtering unit 207 can remove block distortion or quantization distortion, that was not removed by the deblock filter, in the processing-target slice.

That is, similar to the case of the adaptive filtering unit 113, the adaptive filtering unit 207 can appropriately perform filtering for the processing-target slice based on the filter block flag supplied only to the ALF block demanded by the processing-target slice.

Therefore, the image decoding apparatus 200 can appropriately decode the image compression information including only the filter block flag demanded by the image encoding apparatus 100. That is, the image decoding apparatus 200 can suppress degradation of the encoding efficiency by locally controlling the filtering during the encoding or the decoding. For example, even when each frame of the image is divided into a plurality of slices, and the encoded image compression information is decoded for each slice using the adaptive filter and outputted, it is possible to suppress degradation of the encoding efficiency.

3. Third Embodiment

Another Example of Processing-Target ALF Block

In the aforementioned descriptions, the control information creation unit 112 creates the filter block flag for all of the ALF blocks at least including the processing-target slice area and performs filtering for all of the ALF blocks at least including the processing-target slice area adaptive filtering unit 113.

However, for example, when only a single pixel of the processing-target slice area is included in the ALF block, the filtering hardly affects the image quality of the processing-target slice. As such, even when the filtering is performed for the ALF blocks having a small ratio of the processing-target slice area, a sufficient effect may not be obtained, and the processing (load) may become useless.

In this regard, only the ALF blocks including a predetermined ratio or more of the processing-target slice areas may be set to the processing target. This predetermined ratio functioning as a threshold value may be arbitrarily set. In addition, this value may be set previously or may be set to change depending on the contents of the image or the like.

Process Flow

An example of a block information creating process flow in this case will be described with reference to the flowchart of FIG. 16. The flowchart of FIG. 16 corresponds to the flowchart of FIG. 12.

Figure 16:
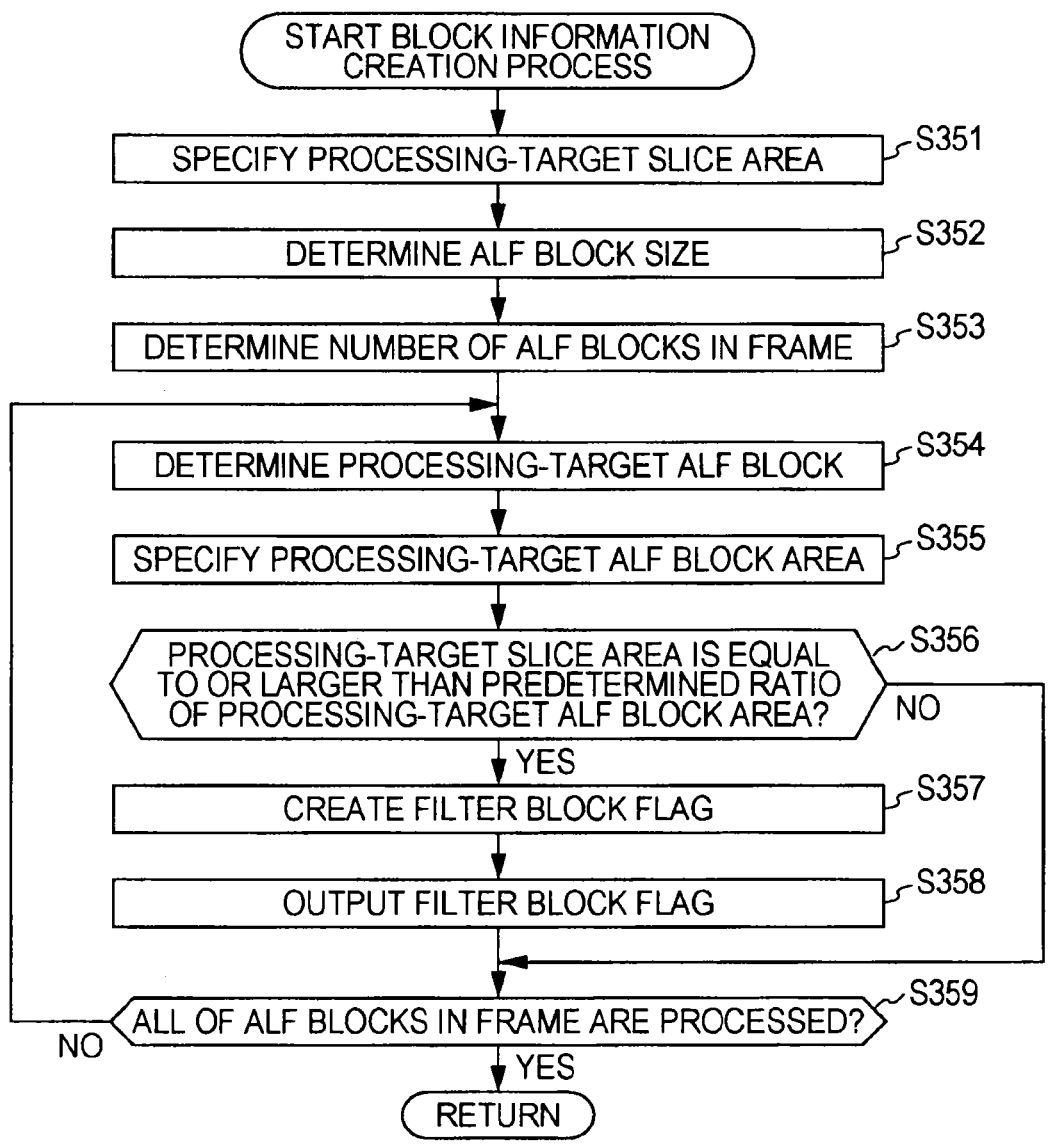
FIG. 16 is a flowchart illustrating another example of the block information creation process flow.

That is, as shown in FIG. 16, even in this case, the block information creation process is performed basically in a similar way to the case described with reference to FIG. 12.

Therefore, the configuration of the control information creation unit 112 in this case is similar to the case of FIG. 3.

Each process of steps S351 to S355 of FIG. 16 is performed in a similar way to each process of steps S151 to S155 of FIG. 12.

However, in FIG. 16, as the processing-target ALF block area is specified, the determination unit 144 determines whether or not a predetermined ratio or more of the processing-target ALF block areas are included in the processing-target slice area in step S356.

If it is determined that a predetermined ratio or more of the processing-target ALF block areas are included in the processing-target slice area, the process advances to step S357. In addition, in step S356, if it is determined that the processing-target ALF blocks included in the processing-target slice area are smaller than a predetermined ratio, the process advances to step S359.

Each process of steps S357 to S359 is performed in a similar way to each process of steps S157 to S159 in FIG. 12.

As such, the condition for creating the filter block flag may be set to a substantially more useful range in comparison with the first embodiment. As a result, the image encoding apparatus 100 and the image decoding apparatus 200 can further suppress degradation of the encoding efficiency.

In addition, while in the aforementioned descriptions, the encoding or the decoding using the adaptive filter is performed on a slice-by-slice basis, the present invention is not limited thereto. The encoding or the decoding may be performed in more accurate data unit if it is smaller than frame unit.

4. Fourth Embodiment

Description of QALF

As disclosed in T. Chujoh, N. Wada and G. Yasuda, "Quadtree-based Adaptive Loop Filter," ITU-T SG16 Q6 VCEG Contribution, VCEG-AK22(r1), Japan, April, 2009, the ALF block may have a quad-tree structure. This technique is called a quadtree-based adaptive loop filter (QALF). In this quadtree structure, a single ALF block area in the upper layer is divided into four layers in the lower layer.

FIGS. 17A to 17D illustrate an example of designating the filter block flag in each ALF block by representing the ALF block division using a quadtree structure having a maximum layer number of 3.

Figures 17A, 17B, 17C, 17D:
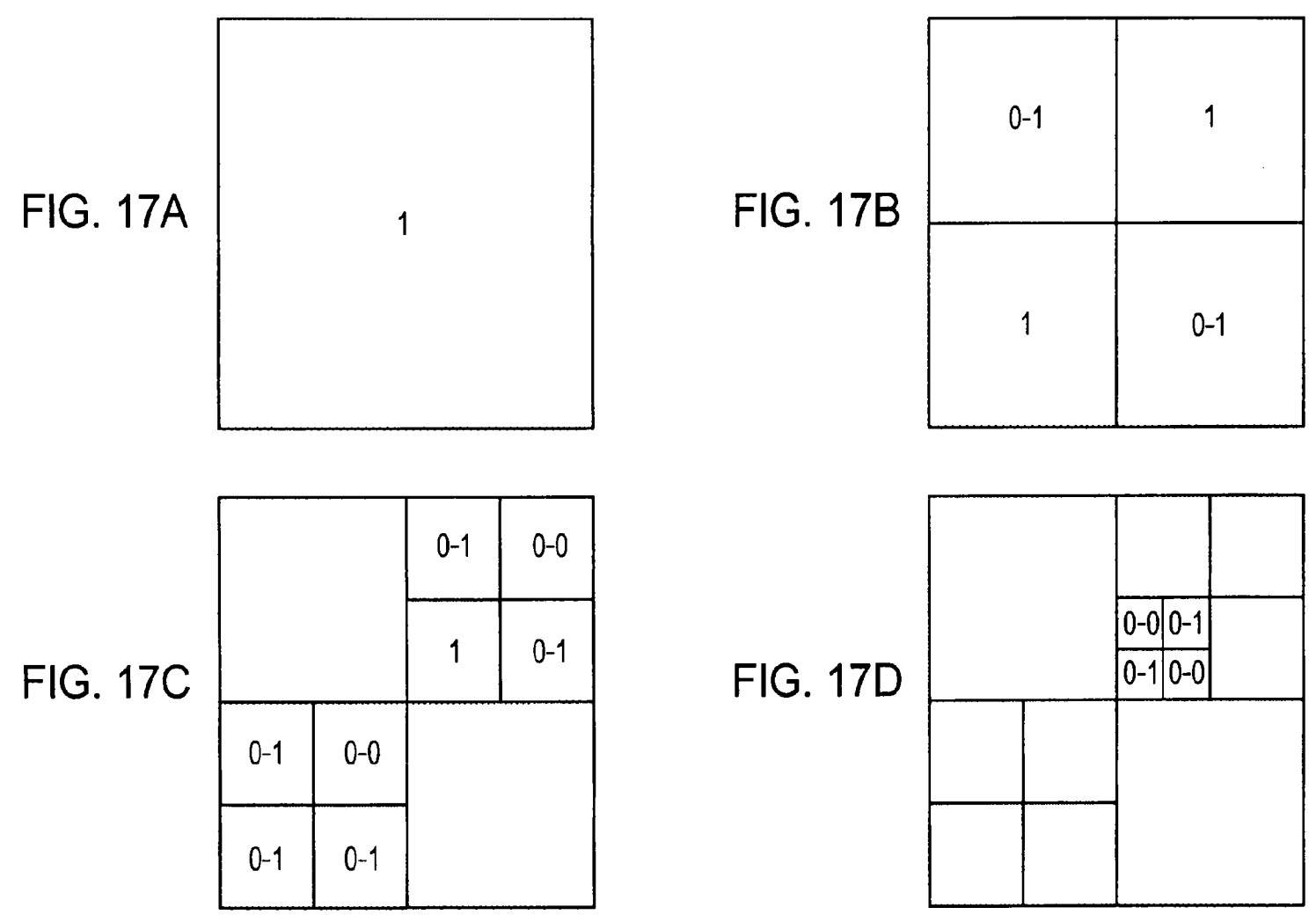

FIG. 17A illustrates a layer 0 which is an ALF block functioning as a basis of the quadtree structure. In the quadtree structure, each ALF block has a block partitioning flag which represents whether or not each ALF block is quad-divided in the lower layer. A value of the block partitioning flag of the ALF block shown in FIG. 17A is set to "1". That is, this ALF block is quad-divided in the lower layer (the layer 1). FIG. 17B shows the layer 1. That is, four ALF blocks are provided in the layer 1.

When the block partitioning flag is set to "0", the ALF block is not quad-divided in the lower layer. That is, there is no more division, and the filter block flag is created for that ALF block. That is, the ALF block having the block partitioning flag having a value of "0" also has the filter block flag. Out of "0-1" shown in FIG. 17B, the left side "0" represents the block partitioning flag of the corresponding ALF block, and the right side "1" represents the filter block flag of the corresponding ALF block.

Two ALF blocks having the block partitioning flag in the layer 1 set to "1" are quad-divided in the further lower layer (the layer 2). FIG. 17C shows the layer 2. That is, 10 ALF blocks are created in the layer 2.

Similarly, the filter block flag may also be assigned to the ALF block having a block partitioning flag set to "0" in the layer 2. In FIG. 17C, the block partitioning flag of a single ALF block is set to "1". That is, that ALF block is quad-divided in the still further lower layer (the layer 3). FIG. 17D shows the layer 3. That is, 13 ALF blocks are created in the layer 3.

Figure 18:
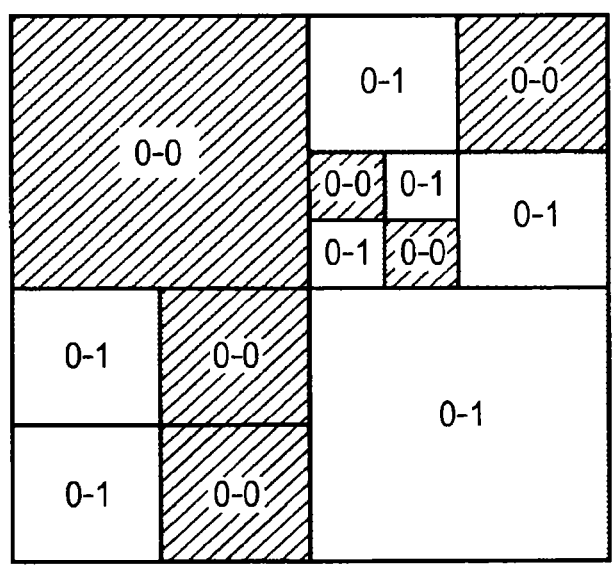
FIG. 18 illustrates another example of the ALF block and the filter block flag.

The final configuration of the ALF block obtained by the quadtree-dividing as shown in FIGS. 17A to 17D is illustrated in FIG. 18. As such, in the quadtree structure, the ALF block size is different in each layer. That is, the ALF block may have a different size within the frame by using the quadtree structure.

The control of the filter block flag in each ALF block is similar to that of the first embodiment. That is, when a value of the filter block flag is "0", the filtering is not performed for the ALF block area (hatched in FIG. 18).

The problem that the encoding efficiency may be degraded in a multi-slice case is also generated when the ALF block is established in the slice area smaller than the frame. Therefore, the same problem is generated in the QALF structure obtained by improving the representation of the ALF block.

Figure 19:
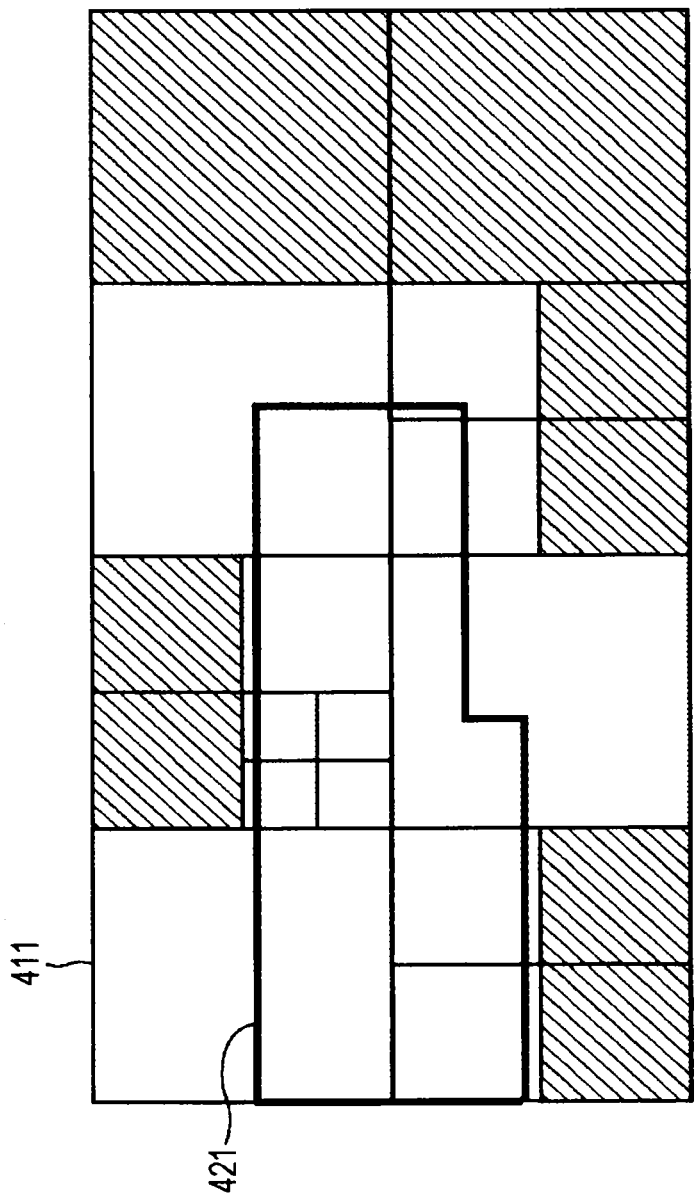
FIG. 19 illustrates a process at a multi-slice.

FIG. 19 illustrates an example of encoding the area of the slice 1 of FIG. 5 using the QALF technique. Here, the area encoded by the bold line 421 represents the area of the slice 1. Similar to the BALF described according to the first embodiment of the invention, the ALF block hatched in FIG. 19 does not include the area of the slice 1 and thus becomes an unnecessary ALF block.

As in the related art, if the filter block flag is provided even in the unnecessary ALF block, the image compression information unnecessarily increases, and the encoding efficiency may be degraded.

Even in the case of the QALF, the image encoding apparatus 100 can suppress the unnecessary filter block flag from being created and included in the slice header using the same way as that of the BALF described according to the first embodiment.

That is, in the image encoding apparatus 100 and the image decoding apparatus 200, it is recognized that the block hatched in FIG. 19 does not include the corresponding slice (the slice 1 in FIG. 19). In this regard, the image encoding apparatus 100 creates the filter block flag for the ALF block having a quadtree structure including the corresponding slice and supplies it to the image decoding apparatus 200 together with the image compression information. Therefore, it is possible to suppress creation of an unnecessary filter block flag and degradation of the encoding efficiency.

5. Fifth Embodiment

Personal Computer

A series of the aforementioned processes may be executed in software as well as hardware. In this case, for example, the present invention may be embodied in a personal computer as shown in FIG. 20.

Figure 20:
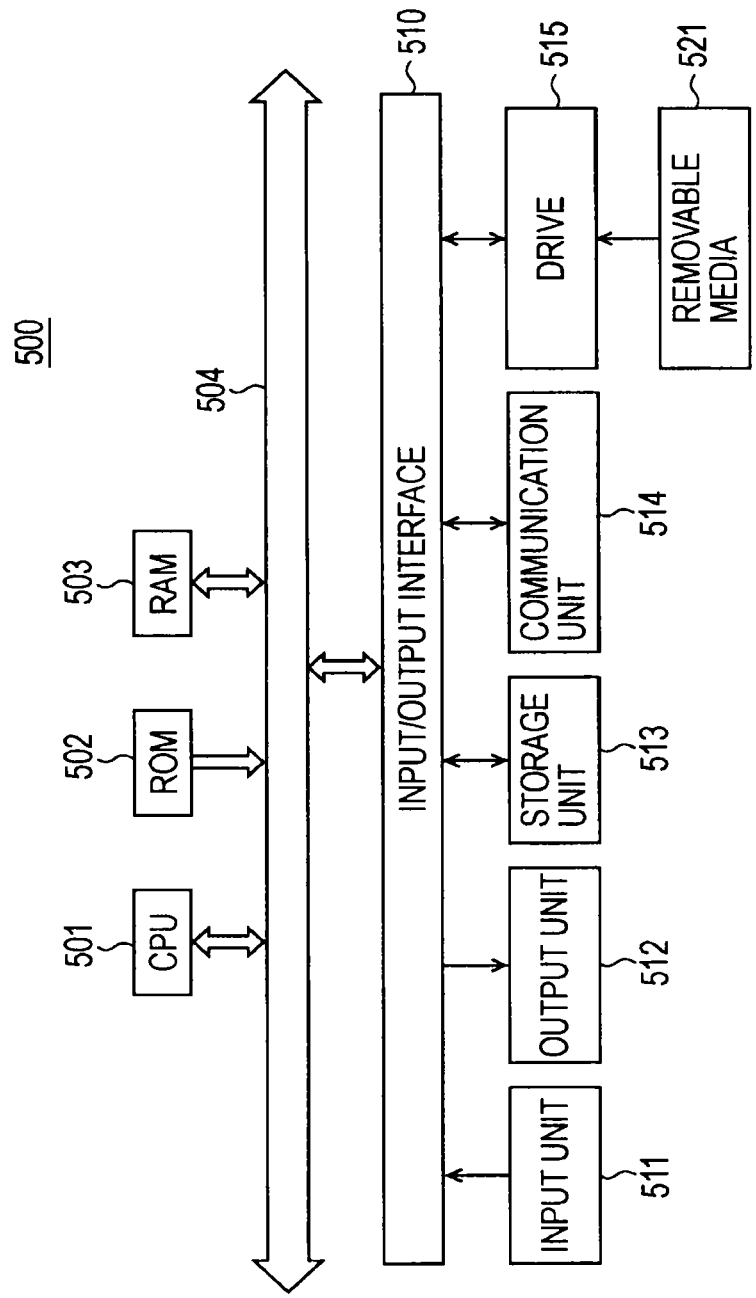
FIG. 20 is a block diagram illustrating an example of a main configuration of a personal computer according to an embodiment of the invention.

In FIG. 20, the CPU 501 of the personal computer 500 executes various processes according to a program stored in a ROM (Read Only Memory) 502 or a program loaded on a RAM (Random Access Memory) 503 from a storage unit 513. The RAM 503 appropriately stores data demanded to execute various processes in the CPU 501.

The CPU 501, the ROM 502, and the RAM 503 are connected to one another via a bus 504. The bus 504 is also connected to the input/output interface 510.

The input/output interface 510 is connected to an input unit 511 such as a keyboard and a mouse, a display unit such as a CRT (Cathode Ray Tube) and an LCD (Liquid Crystal Display), an output unit 512 such as a loudspeaker, a storage unit 513 such as a hard disc, and a communication unit 514 such as a modem. The communication unit 514 performs a communication process via networks including the Internet.

The input/output interface 510 is connected to a drive 515 if necessary, and a removable media 521 such as a magnetic disc, an optical disc, an optical-magnetic disc, or a semiconductor memory is appropriately installed, so that a computer program read therefrom is installed in the storage unit 513 if necessary.

When a series of the aforementioned processes are executed in software, the program constituting the software is installed from a network or a recording medium.

For example, the recording medium may include a removable medium 521 such as a magnetic disc (including a flexible disc), an optical disc (including a CD-ROM (Compact Disc-Read Only Memory), a DVD (Digital Versatile Disc), etc), an optical magnetic disc (MD (Mini Disc)), or a semiconductor memory that records a program distributed to deliver a program to users, separate from a device mainframe as shown in FIG. 20, a ROM 502 delivered to a user while in advance assembled in a device mainframe for storing a program, a hard disc included in the storage unit 513, or the like.

The program executed by the computer may be processed in a time series according to the sequence described herein or processed in parallel or in a necessary timing, for example, when it is called.

Herein, the steps for describing the program stored in the recording medium may include processes executed in a time series according to the described sequence or executed in parallel or individually without being processed in a time series.

In addition, herein, a system refers to the entire apparatus including a plurality of devices (apparatuses).

In the aforementioned descriptions, a configuration described as a single apparatus (or a processing unit) may be made of a plurality of apparatuses (or processing units). On the contrary, the configuration described as a plurality of apparatuses (or processing units) may be made of a single apparatus (or a processing unit). In addition, other configurations than those described above may be added to the configuration of each apparatus (or each processing unit). Furthermore, if the configurations or the operations are substantially the same from a systematic viewpoint, a part of the configuration of any apparatus (or processing unit) may be included in the configurations of other apparatuses (or other processing units). That is, embodiments of the invention are not limited to those described above, but may be variously changed without departing from the spirit and the scope of the invention.

For example, the image encoding apparatus 100 or the image decoding apparatus 200 described above may be applied to any electronic device. Hereinafter, an example thereof will be described.

6. Sixth Embodiment

Television Set

Figure 21:
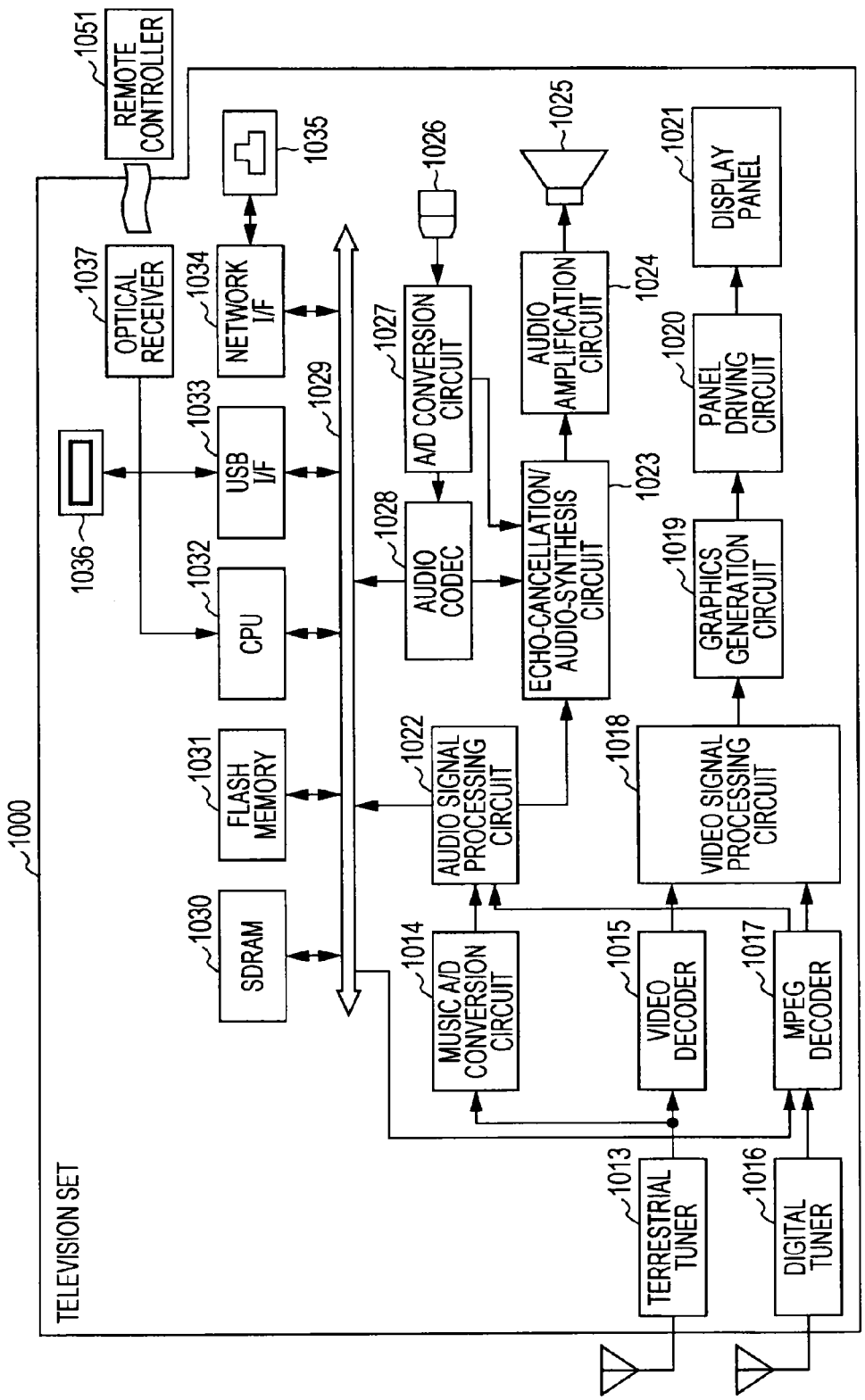
FIG. 21 is a block diagram illustrating an example of a main configuration of a television set according to an embodiment of the invention.

FIG. 21 is a block diagram illustrating an example of a main configuration of a television set which uses the image decoding apparatus 200 according to an embodiment of the invention.

The television set 1000 shown in FIG. 21 includes a terrestrial tuner 1013, a video decoder 1015, a video signal processing circuit 1018, a graphics generation circuit 1019, a panel driving circuit 1020, and a display panel 1021.

The terrestrial tuner 1013 receives a broadcasting wave signal of a terrestrial analog broadcasting via an antenna, demodulates it to obtain a video signal, and supplies it to the video decoder 1015. The video decoder 1015 performs a decoding process for the video signal supplied from the terrestrial tuner 1013 and supplies the resultant digital component signal to the video signal processing circuit 1018.

The video signal processing circuit 1018 performs a predetermined process such as noise removal for the video data supplied from the video decoder 1015 and supplies the resultant video data to the graphics generation circuit 1019.

The graphics generation circuit 1019 generates video data of a program displayed on the display panel 1021 or image data obtained through a process based on an application supplied via a network and supplies the generated video or image data to the panel driving circuit 1020. In addition, the graphics generation circuit 1019 appropriately performs a process for generating video data (graphics) for displaying a window used by a user to select an item and supplying video data obtained by overlapping the graphics with video data of a program to the panel driving circuit 1020.

The panel driving circuit 1020 drives the display panel 1021 based on the data supplied from the graphics generation circuit 1019 and displays a program video or various windows described above on the display panel 1021.

The display panel 1021 is made of an LCD (Liquid Crystal Display) to display a program video under control of the panel driving circuit 1020.

In addition, the television set 1000 also includes an audio A/D (Analog/Digital) conversion circuit 1014, an audio signal processing circuit 1022, an echo cancellation/audio synthesis circuit 1023, an audio amplification circuit 1024, and a loudspeaker 1025.

The terrestrial tuner 1013 obtains an audio signal as well as a video signal by demodulating the received broadcasting wave signal. The terrestrial tuner 1013 supplies the obtained audio signal to the audio A/D conversion circuit 1014.

The audio A/D conversion circuit 1014 performs an A/D conversion process for the audio signal supplied from the terrestrial tuner 1013 and supplies the resultant digital audio signal to the audio signal processing circuit 1022.

The audio signal processing circuit 1022 performs a predetermined process such as noise removal for the audio data supplied from the audio A/D conversion circuit 1014 and supplies the resultant audio data to the echo cancellation/audio synthesis circuit 1023.

The echo cancellation/audio synthesis circuit 1023 supplies the audio data supplied from the audio signal processing circuit 1022 to the audio amplification circuit 1024.

The audio amplification circuit 1024 performs a D/A conversion process and an amplification process for the audio data supplied from the echo cancellation/audio synthesis circuit 1023 to adjust the audio to a predetermined volume and outputs the audio to the loudspeaker 1025.

Furthermore, the television set 1000 also has a digital tuner 1016 and an MPEG decoder 1017.

The digital tuner 1016 receives a digital broadcasting wave signal (such as a terrestrial digital broadcasting or a BS (Broadcasting Satellite)/CS(Communications Satellite) digital broadcasting) via an antenna, demodulates it to obtain an MPEG-TS (Moving Picture Experts Group-Transport Stream), and supplies it to the MPEG decoder 1017.

The MPEG decoder 1017 releases a scramble applied to the MPEG-TS supplied from the digital tuner 1016 to extract program data streams of a reproduction target (a watching target). The MPEG decoder 1017 decodes audio packets included in the extracted streams and supplies the resultant audio data to the audio signal processing circuit 1022. At the same time, the MPEG decoder 1017 decodes the video packets included in the streams and supplies the resultant video data to the video signal processing circuit 1018. The MPEG decoder 1017 supplies the EPG (Electronic Program Guide) data extracted from the MPEG-TS to the CPU 1032 via a path (not shown).

The television set 1000 uses the aforementioned image decoding apparatus 200 as the MPEG decoder 1017 for decoding video packets as described above. In addition, the MPEG-TS transmitted from a broadcasting center or the like is encoded by the image encoding apparatus 100.

Similar to the image decoding apparatus 200, the MPEG decoder 1017 appropriately decodes the image compression information including only the filter block flag necessary for the image encoding apparatus 100. Therefore, it is possible to suppress degradation of the encoding efficiency by locally controlling the filtering. For example, even when each frame of the image is divided into a plurality of slices, and the image compression information encoded for each slice is decoded using the adaptive filter to output it, it is possible to suppress degradation of the encoding efficiency.

Similar to the video data supplied from the video decoder 1015, the video data supplied from the MPEG decoder 1017 is subjected to a predetermined process in the video signal processing circuit 1018, appropriately overlapped with the video data generated in the graphics generation circuit 1019, and supplied to the display panel 1021 via the panel driving circuit 1020 so that the image is displayed.

Similar to the audio signal supplied from the audio A/D conversion circuit 1014, the audio data supplied from the MPEG decoder 1017 is subjected to a predetermined process in the audio signal processing circuit 1022, supplied to a the audio amplification circuit 1024 via the echo cancellation/audio synthesis circuit 1023, and subjected to a D/A conversion process or an amplification process. As a result, audio adjusted to a predetermined volume is output from the loudspeaker 1025.

The television set 1000 also has a microphone 1026 and an A/D conversion circuit 1027.

The A/D conversion circuit 1027 receives a user's voice through a microphone 1026 provided in the television set 1000 for voice communication, performs an A/D conversion process for the received voice signal, and supplies the resultant digital audio data to the echo cancellation/audio synthesis circuit 1023.

When the voice data of a user (user A) of the television set 1000 are supplied from the A/D conversion circuit 1027, the echo cancellation/audio synthesis circuit 1023 performs echo cancellation for the voice data of a user A, synthesizes them with another audio data, and supplies the resultant audio data to the loudspeaker 1025 via the audio amplification circuit 1024.

Furthermore, the television set 1000 also includes an audio codec 1028, an internal bus 1029, an SDRAM (Synchronous Dynamic Random Access Memory) 1030, a flash memory 1031, a CPU 1032, an USB (Universal Serial Bus) I/F 1033, and a network I/F 1034.

The A/D conversion circuit 1027 receives a user's voice signal received by the microphone 1026 provided in the television set 1000 for voice communication, performs an A/D conversion process for the received voice signal, and supplies the resultant digital audio data to the audio codec 1028.

The audio codec 1028 converts the audio data supplied from the A/D conversion circuit 1027 into data having a predetermined format for transmitting via a network and supplies the data to the network I/F 1034 via an internal bus 1029.

The network I/F 1034 is connected to a network via a cable installed in the network terminal 1035. The network I/F 1034 transmits the audio data supplied from the audio codec 1028, for example, to another device connected to that network. In addition, the network I/F 1034 receives the audio data, for example, transmitted from another device connected via a network, through a network terminal 1035 and supplies the audio data to the audio codec 1028 through the internal bus 1029.

The audio codec 1028 converts the audio data supplied from the network I/F 1034 into the data having a predetermined format and supplies the data to the echo cancellation/audio synthesis circuit 1023.

The echo cancellation/audio synthesis circuit 1023 performs echo cancellation for the audio data supplied from the audio codec 1028 and outputs the audio data obtained by synthesizing them with another audio data to the loudspeaker 1025 via the audio amplification circuit 1024.

The SDRAM 1030 stores various data necessary for the CPU 1032 to perform processes.

The flash memory 1031 stores a program executed by the CPU 1032. A program stored in the flash memory 1031 is read by the CPU 1032 at a predetermined timing such as when the television set 1000 is operated. The flash memory 1031 also stores the EPG data obtained through a digital broadcasting or the data obtained from a predetermined server via a network.

For example, the flash memory 1031 stores the MPEG-TS including contents data obtained from a predetermined server via a network under control of the CPU 1032. The flash memory 1031 supplies the MPEG-TS to the MPEG decoder 1017 via an internal bus 1029, for example, under control of the CPU 1032.

Similar to the MPEG-TS supplied from the digital tuner 1016, the MPEG decoder 1017 processes the MPEG-TS. As such, the television set 1000 may receive contents data including the video and the audio via a network. The contents data may be decoded using the MPEG decoder 1017, and the video or the audio may be displayed or output.

In addition, the television set 1000 also includes an optical receiver 1037 for receiving an infrared signal transmitted from the remote controller 1051.

The optical receiver 1037 receives the infrared light from the remote controller 1051 and outputs the control code representing a user's manipulation obtained by decoding the light to the CPU 1032.

The CPU 1032 executes the program stored in the flash memory 1031 and controls the entire operation of the television set 1000 according to the control code supplied from the optical receiver 1037. Each component of the television set 1000 and the CPU 1032 are connected to one another via a path (not shown).

The USB I/F 1033 transmits/receives data to/from a device outside the television set 1000 connected via a USB cable installed in the USB terminal 1036. The network I/F 1034 is connected to a network via a cable installed in the network terminal 1035 and also transmits/receives data other than the audio data to/from various devices connected to a network.

The television set 1000 can appropriately decode the image compression information including only the filter block flag demanded by the image encoding apparatus 100 by using the image decoding apparatus 200 as the MPEG decoder 1017. As a result, the television set 1000 can suppress degradation of the encoding efficiency for locally controlling the filtering for the broadcasting signal received via an antenna or the contents data obtained via a network.

7. Seventh Embodiment

Mobile Phone

Figure 22:
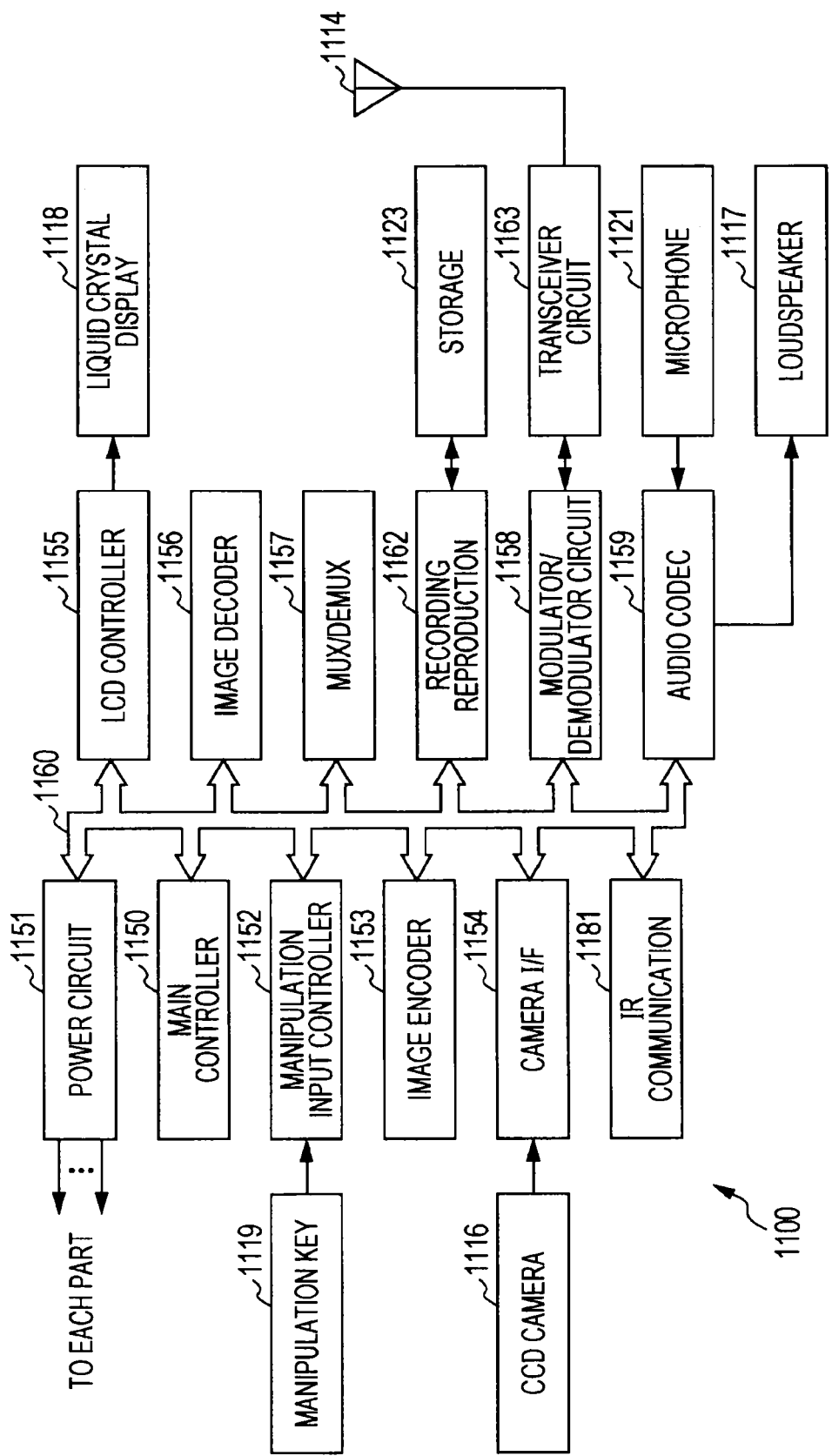
FIG. 22 is a block diagram illustrating an example of a main configuration of a mobile phone device according to an embodiment of the invention.

FIG. 22 is a block diagram illustrating an example of a main configuration of the mobile phone used in the image encoding apparatus and the image decoding apparatus according to an embodiment of the invention.

The mobile phone 1100 shown in FIG. 22 includes a main control unit 1150 configured to collectively control each component, a power circuit unit 1151, a manipulation input control unit 1152, an image encoder 1153, a camera I/F unit 1154, an LCD control unit 1155, an image decoder 1156, a multiplexer/demultiplexer unit 1157, a recording reproduction unit 1162, a modulation/demodulation circuit unit 1158, and an audio codec 1159. These units are connected to one another via a bus 1160.

In addition, the mobile phone 1100 includes a manipulation key 1119, a CCD (Charge Coupled Devices) camera 1116, a liquid crystal display 1118, a storage unit 1123, a transceiver circuit 1163, an antenna 1114, a microphone 1121, and a loudspeaker 1117.

When a call-clearing and power key is turned on by a user's manipulation, the power circuit unit 1151 drives the mobile phone 1100 to an operable state by supplying power to each component from a battery pack.

The mobile phone 1100 performs various operations such as transmitting/receiving audio signals, electronic mails, or image data, taking an image, and recording data using various modes such as a voice calling mode or a data communication mode based on the control of the main control unit 1150 including a CPU, a ROM, a RAM, or the like.

For example, in the voice calling mode, the mobile phone 1100 converts a voice signal collected from the microphone 1121 into digital audio data using the audio codec 1159, performs a spectrum diffusion process using the modulation/demodulation circuit unit 1158, and performs a digital-analog conversion process and a frequency conversion process using the transceiver circuit 1163. The mobile phone 1100 transmits the transmission signal obtained by those conversion processes to a base station (not shown) via an antenna 1114. The transmission signal (audio signal) transmitted to the base station is supplied to the mobile phone of a called party via a public switched telephone network.

For example, in the voice calling mode, the mobile phone 1100 amplifies the receive signal received by the antennal 1114 using the transceiver circuit 1163, performs a frequency conversion process and an analog-digital conversion process, performs a spectrum inverse diffusion process using the modulation/demodulation circuit unit 1158, and converts it into the analog audio signal using the audio codec 1159. The mobile phone 1100 outputs the analog audio signal resulting from the conversion to the loudspeaker 1117.

For example, when an electronic mail is transmitted in a data communication mode, the mobile phone 1100 receives electronic mail text data input by the manipulation of the manipulation key 1119 using the manipulation input control unit 1152. The mobile phone 1100 processes the text data using the main control unit 1150 and displays the data as an image on the liquid crystal display 1118 using the LCD control unit 1155.

The mobile phone 1100 generates the electronic mail data based on a user's instruction or the text data received by the manipulation input control unit 1152 using the main control unit 1150. The mobile phone 1100 performs a spectrum diffusion process for the electronic mail data using the modulation/demodulation circuit unit 1158 and performs a digital-analog conversion process and a frequency conversion process using the transceiver circuit 1163. The mobile phone 1100 transmits the transmission signal obtained through those conversion processes to a base station (not shown) via an antenna 1114. The transmission signal (electronic mail) transmitted to the base station is supplied to a predetermined destination via a network, a mail server, or the like.

For example, when the electronic mail is received in the data communication mode, the mobile phone 1100 receives the signal transmitted from the base station using the transceiver circuit 1163 via the antenna 1114, amplifies the signal, and further performs a frequency conversion process and an analog-digital conversion process. The mobile phone 1100 performs a spectrum inverse diffusion process for that receive signal using the modulation/demodulation circuit unit 1158 to restore the original electronic mail data. The mobile phone 1100 displays the restored electronic mail data on the liquid crystal display 1118 using the LCD control unit 1155.

In addition, the mobile phone 1100 may record the received electronic mail data in the storage unit 1123 using the recording reproduction unit 1162.

This storage unit 1123 is an arbitrary rewritable storage medium. The storage unit 1123 may include, for example, a semiconductor memory such as a RAM or an internal flash memory, a hard disc, or a removable medium such as a magnetic disc, an optical magnetic disc, an optical disc, a USB memory, or a memory card. Needless to say, other storage mediums may be used.

For example, when the image data is transmitted in the data communication mode, the mobile phone 1100 creates image data by capturing an image using a CCD camera 1116. The CCD camera 1116 has an optical device such as a lens or an aperture and a CCD as an photoelectric conversion element. The CCD camera 1116 captures an image of an object, converts an intensity of the received light into an electric signal, and creates image data of an image of the object. The CCD camera 1116 encodes the image data using the image encoder 1153 through the camera I/F unit 1154 to convert the image data into the encoded image data.

The mobile phone 1100 uses the image encoding apparatus 100 as an image encoder 1153 for executing these processes. Therefore, similar to the image encoding apparatus 100, the image encoder 1053 can suppress degradation of the encoding efficiency by locally controlling the filtering. For example, even when each frame of the image is divided into a plurality of slices, and each slice is encoded using the adaptive filter and output, the image encoder 1053 can suppress degradation of the encoding efficiency.

In addition, at the same time, the mobile phone 1100 analog-to-digital converts the audio signal collected by the microphone 1121 during the image capturing of the CCD camera 1116 using the audio codec 1159 and further encodes the collected audio signal.

The mobile phone 1100 multiplexes the encoded image data supplied from the image encoder 1153 and the digital audio data supplied from the audio codec 1159 using the multiplexer/demultiplexer unit 1157 according to a predetermined scheme. The mobile phone 1100 performs a spectrum diffusion process for the resultant multiplexed data using the modulation/demodulation circuit unit 1158 and performs a digital-analog conversion process and a frequency conversion process using the transceiver circuit 1163. The mobile phone 1100 transmits the transmission signal obtained by the conversion processes to a base station (not shown) via an antenna 1114. The transmission signal (image data) transmitted to the base station is supplied to the called party via a network or the like.

In addition, when the image data is not transmitted, the mobile phone 1100 may display the image data generated by the CCD camera 1116 on the liquid crystal display 1118 using the LCD control unit 1155 without using the image encoder 1153.

For example, in the data communication mode, when the data of a moving picture file is linked to a simplified homepage, the mobile phone 1100 receives the signal transmitted from the base station via the antenna 1114 using the transceiver circuit 1163, amplifies it, and performs a frequency conversion process and an analog-digital conversion process. The mobile phone 1100 performs a spectrum inverse diffusion process for the receive signal using the modulation/demodulation circuit unit 1158 to restore the original multiplexed data. The mobile phone 1100 separates the multiplexed data using the multiplexer/demultiplexer unit 1157 and divides them into encoded image data and audio data.

The mobile phone 1100 creates reproduction moving picture data by decoding the encoded image data using the image decoder 1156 and displays them on the liquid crystal display 1118 using the LCD control unit 1155. As a result, for example, the moving picture data included in the moving picture file linked to the simplified homepage are displayed on the liquid crystal display 1118.

The mobile phone 1100 uses the aforementioned image decoding apparatus 200 as the image decoder 1156 for executing such a process. Therefore, similar to the image decoding apparatus 200, the image decoder 1156 appropriately decodes the image compression information including only the filter block flag demanded by the image encoding apparatus 100. Therefore, as a result, it is possible to suppress degradation of the encoding efficiency by locally controlling the filtering. For example, even when each frame of the image is divided into a plurality of slices, and the image compression information encoded for each slice is decoded using the adaptive filter and output, it is possible to suppress degradation of the encoding efficiency.

In this case, the mobile phone 1100 converts the digital audio data into the analog audio signal using the audio codec 1159 and outputs the analog audio signal to the loudspeaker 1117. As a result, for example, the audio data included in the moving picture file linked to a simplified homepage is reproduced.

In addition, similar to the electronic mail, the mobile phone 1100 may record (store) the received data linked to a simplified homepage in the storage unit 1123 using the recording reproduction unit 1162.

In the mobile phone 1100, the main control unit 1150 analyzes the 2-dimensional code obtained by the CCD camera 1116 through the image capturing so as to obtain the information recorded on the 2-dimensional code.

Furthermore, the mobile phone 1100 can communicate with an external device using the infrared communication unit 1181 through an infrared ray.

In the mobile phone 1100, by using the image encoding apparatus 100 as the image encoder 1153, it is possible to suppress degradation of the encoding efficiency caused by locally controlling the filtering, for example, for the encoded data created by encoding the image data generated in the CCD camera 1116. As a result, the mobile phone 1100 can provide the encoded data (image data) having an excellent encoding efficiency to other devices.

In addition, in the mobile phone 1100, by using the image decoding apparatus 200 as the image decoder 1156, it is possible to appropriately decode the image compression information including only the filter block flag demanded by the image encoding apparatus 100. As a result, in the mobile phone 1100, it is possible to suppress degradation of the encoding efficiency for locally controlling the filtering, for example, for the data on a moving picture file linked to a simplified homepage.

While, in the aforementioned descriptions, the CCD camera 1116 is used in the mobile phone 1100, an image sensor using a CMOS (Complementary Metal Oxide Semiconductor) (CMOS image sensor) may be used instead of the CCD camera 1116. Even in this case, similar to the CCD camera 1116, the mobile phone 1100 can create image data on the image of an object by capturing the image of the object.

While, in the aforementioned descriptions, the mobile phone 1100 has been exemplified, the image encoding apparatus 100 and the image decoding apparatus 200 may be applied to any other apparatus having an image capturing function or a communication function similar to the mobile phone 1100, such as a PDA (Personal Digital Assistants), a smart phone, a UMPC (Ultra Mobile Personal Computer), a net-book, or a notebook type personal computer.

8. Eighth Embodiment

Hard Disc Recorder

Figure 23:
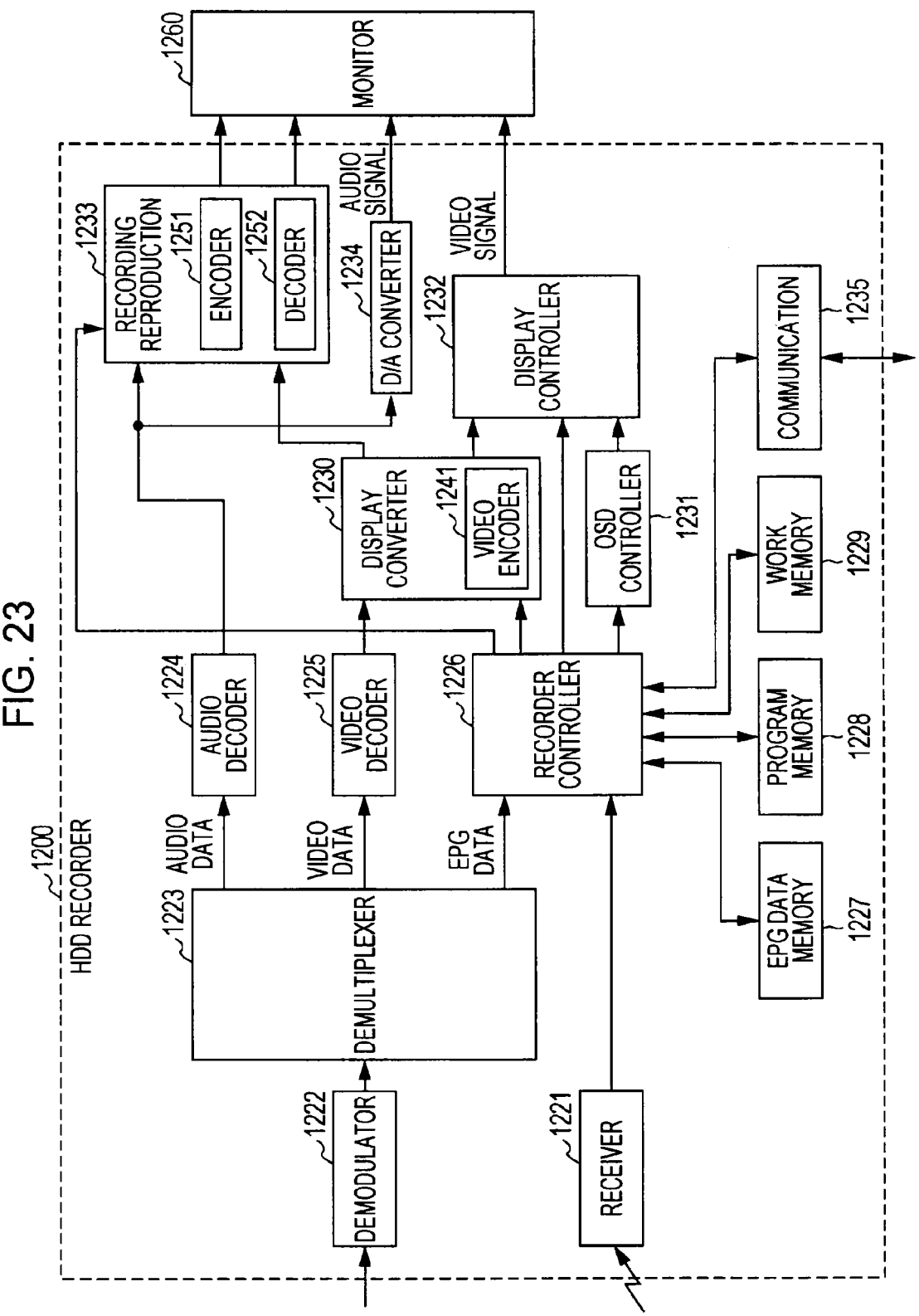
FIG. 23 is a block diagram illustrating an example of a main configuration of a hard disc recorder according to an embodiment of the invention.

FIG. 23 is a block diagram illustrating an example of a main configuration of the hard disc recorder using the image encoding apparatus and the image decoding apparatus according to an embodiment of the invention.

The hard disc recorder (HDD recorder) 1200 shown in FIG. 23 is an apparatus for storing, in an internal hard disc, audio data and video data of a broadcasting program included in the broadcasting wave signal (television signal) transmitted from a satellite or a terrestrial antenna or the like and received by the tuner and providing the stored data to a user at the timing responding to a user's instruction.

The hard disc recorder 1200 may extract the audio data and the video data, for example, from the broadcasting signal, appropriately decode them, and store them in the hard disc. The hard disc recorder 1200 may obtain the audio data or the video data from other devices, for example, via a network, decode them, and store them in an internal hard disc.

Furthermore, the hard disc recorder 1200 may decode the audio data or the video data stored, for example, in an internal hard disc, supply them to a monitor 1260, display the image on a screen of the monitor 1260, and output the audio from the loudspeaker of the monitor 1260. In addition, the hard disc recorder 1200 may decode, for example, the audio data and the video data extracted from the broadcasting signal obtained using a tuner or the audio data or the video data obtained from other devices via a network, supply them to the monitor 1260, display the image on a screen of the monitor 1260, and output the audio from the loudspeaker of the monitor 1260.

Of course, other operations may be possible.

As shown in FIG. 23, the hard disc recorder 1200 includes a receiver unit 1221, a demodulation unit 1222, a demultiplexer 1223, an audio decoder 1224, a video decoder 1225, and a recorder control unit 1226. The hard disc recorder 1200 further includes an EPG data memory 1227, a program memory 1228, a work memory 1229, a display converter 1230, an OSD (On Screen Display) control unit 1231, a display control unit 1232, a recording reproduction unit 1233, a D/A converter 1234, and a communication unit 1235.

In addition, the display converter 1230 includes a video encoder 1241. The recording reproduction unit 1233 includes an encoder 1251 and a decoder 1252.

The receiver unit 1221 receives an infrared signal from a remote controller (not shown), converts it into an electric signal, and outputs it to the recorder control unit 1226. The recorder control unit 1226 is configured of, for example, a microprocessor or the like and executes various processes depending on a program stored in the program memory 1228. In this case, the recorder control unit 1226 uses the work memory 1229 as necessary.

The communication unit 1235 is connected to a network and communicates with other apparatuses via a network. For example, the communication unit 1235 is controlled by the recorder control unit 1226 and communicates with a tuner (not shown) to usually output a channel selection control signal to the tuner.

The demodulation unit 1222 demodulates the signal supplied from the tuner and outputs it to the demultiplexer 1223. The demultiplexer 1223 separates the data supplied from the demodulation unit 1222 into the audio data, the video data, and the EPG data and outputs them to the audio decoder 1224, the video decoder 1225, or the recorder control unit 1226, respectively.

The audio decoder 1224 decodes the input audio data and outputs them to the recording reproduction unit 1233. The video decoder 1225 decodes the input video data and outputs them to the display converter 1230. The recorder control unit 1226 supplies the input EPG data to the EPG data memory 1227 to store them therein.

The display converter 1230 encodes the video data supplied from the video decoder 1225 or the recorder control unit 1226 into, for example, NTSC (National Television Standards Committee) type video data using the video encoder 1241 and outputs it to the recording reproduction unit 1233. In addition, the display converter 1230 converts the screen size of the video data supplied from the video decoder 1225 or the recorder control unit 1226 into a size corresponding to the size of the monitor 1260, converts them into the NTSC type video data using the video encoder 1241, converts them into an analog signal, and outputs them to the display control unit 1232.

The display control unit 1232 overlaps the OSD signal output from the OSD control unit 1231 with the video signal input from the display converter 1230 under control of the recorder control unit 1226 and outputs it to the display unit of the monitor 1260 to display it.

In addition, the audio data output from the audio decoder 1224 is converted into the analog signal by the D/A converter 1234 and supplied to the monitor 1260. The monitor 1260 outputs this audio signal from the internal loudspeaker.

The recording reproduction unit 1233 has a hard disc as a storage medium for recording the video data, the audio data, or the like.

The recording reproduction unit 1233 encodes, for example, the audio data supplied from the audio decoder 1224 using the encoder 1251. In addition, the recording reproduction unit 1233 encodes the video data supplied from the video encoder 1241 of the display converter 1230 using the encoder 1251. The recording reproduction unit 1233 synthesizes the encoded data of the audio data with the encoded data of the video data using the multiplexer. The recording reproduction unit 1233 performs a channel encoding for the synthesized data, amplifies the data, and writes the data on the hard disc using a recording head.

The recording reproduction unit 1233 reproduces the data recorded on the hard disc using a reproduction head, amplifies the data, and separates it into the audio data and the video data using the demultiplexer. The recording reproduction unit 1233 decodes the audio data and the video data using the decoder 1252. The recording reproduction unit 1233 digital-to-analog converts the decoded audio data and outputs the result to the loudspeaker of the monitor 1260. In addition, the recording reproduction unit 1233 digital-to-analog converts the decoded video data and outputs the result to the display unit of the monitor 1260.

The recorder control unit 1226 reads the most current EPG data from the EPG data memory 1227 based on a user's instruction represented by the infrared ray signal received by the receiver unit 1221 from the remote controller and supplies it to the OSD control unit 1231. The OSD control unit 1231 generates image data corresponding to the input EPG data and outputs it to the display control unit 1232. The display control unit 1232 outputs the video data input from the OSD control unit 1231 to the display unit of the monitor 1260 and displays it. As a result, the EPG (electronic program guide) is displayed on the display unit of the monitor 1260.

In addition, the hard disc recorder 1200 can obtain various data such as the video data, the audio data, or the EPG data supplied from other devices via a network such as the Internet.

The communication unit 1235 is controlled by the recorder control unit 1226 to obtain encoded data such as video data, audio data, and EPG data transmitted from other devices via a network and supply them to the recorder control unit 1226. The recorder control unit 1226 supplies, for example, the obtained encoded data of the video data or the audio data to the recording reproduction unit 1233 and stores them in the hard disc. In this case, the recorder control unit 1226 and the recording reproduction unit 1233 may perform a re-encoding or the like as necessary.

In addition, the recorder control unit 1226 decodes the encoded data of the obtained video data or the audio data and supplies the resultant video data to the display converter 1230. Similar to the video data supplied from the video decoder 1225, the display converter 1230 processes the video data supplied from the recorder control unit 1226 and supplies the video data to the monitor 1260 using the display control unit 1232 to display the image.

In addition, in synchronization with the image display, the recorder control unit 1226 may supply the decoded audio data to the monitor 1260 via the D/A converter 1234 and output the audio from the loudspeaker.

Furthermore, the recorder control unit 1226 decodes the encoded data of the obtained EPG data and supplies the decoded EPG data to the EPG data memory 1227.

The hard disc recorder 1200 described above uses the image decoding apparatus 200 as a decoder embedded in the video decoder 1225, the decoder 1252, and the recorder control unit 1226. Therefore, similar to the image decoding apparatus 200, the decoder embedded in the video decoder 1225, the decoder 1252, and the recorder control unit 1226 appropriately decode the image compression information including only the filter block flag demanded by the image encoding apparatus 100. Therefore, as a result, it is possible to suppress degradation of the encoding efficiency by locally controlling the filtering. For example, even when each frame of the image is divided into a plurality of slices, and the image compression information encoded for each slice is decoded using the adaptive filter and output, it is possible to suppress degradation of the encoding efficiency.

Therefore, the hard disc recorder 1200 can appropriately decode the image compression information including only the filter block flag demanded by the image encoding apparatus 100. As a result, the hard disc recorder 1200 can suppress degradation of the encoding efficiency for locally controlling the filtering, for example, for the video data received through the tuner or the communication unit 1235 or the video data recorded on the hard disc of the recording reproduction unit 1233.

In addition, the hard disc recorder 1200 uses the image encoding apparatus 100 as the encoder 1251. Therefore, similar to the image encoding apparatus 100, the encoder 1251 can suppress degradation of the encoding efficiency for locally controlling the filtering. For example, even when each frame of the image is divided into a plurality of slices, and each slice is decoded using the adaptive filter and output, the encoder 1251 can suppress degradation of the encoding efficiency.

Therefore, the hard disc recorder 1200 can suppress degradation of the encoding efficiency by locally controlling the filtering, for example, for the encoded data recorded on the hard disc. As a result, the hard disc recorder 1200 can more efficiently use the storage area of the hard disc.

While, in the aforementioned descriptions, the hard disc recorder 1200 which records the video data or the audio data on a hard disc has been exemplified, any other recording medium may be used. For example, even when the recorder uses a recording media such as a flash memory, an optical disc, or a video tape other than the hard disc, similar to the aforementioned hard disc recorder 1200, the image encoding apparatus 100 and the image decoding apparatus 200 can be used.

9. Ninth Embodiment

Camera

Figure 24:
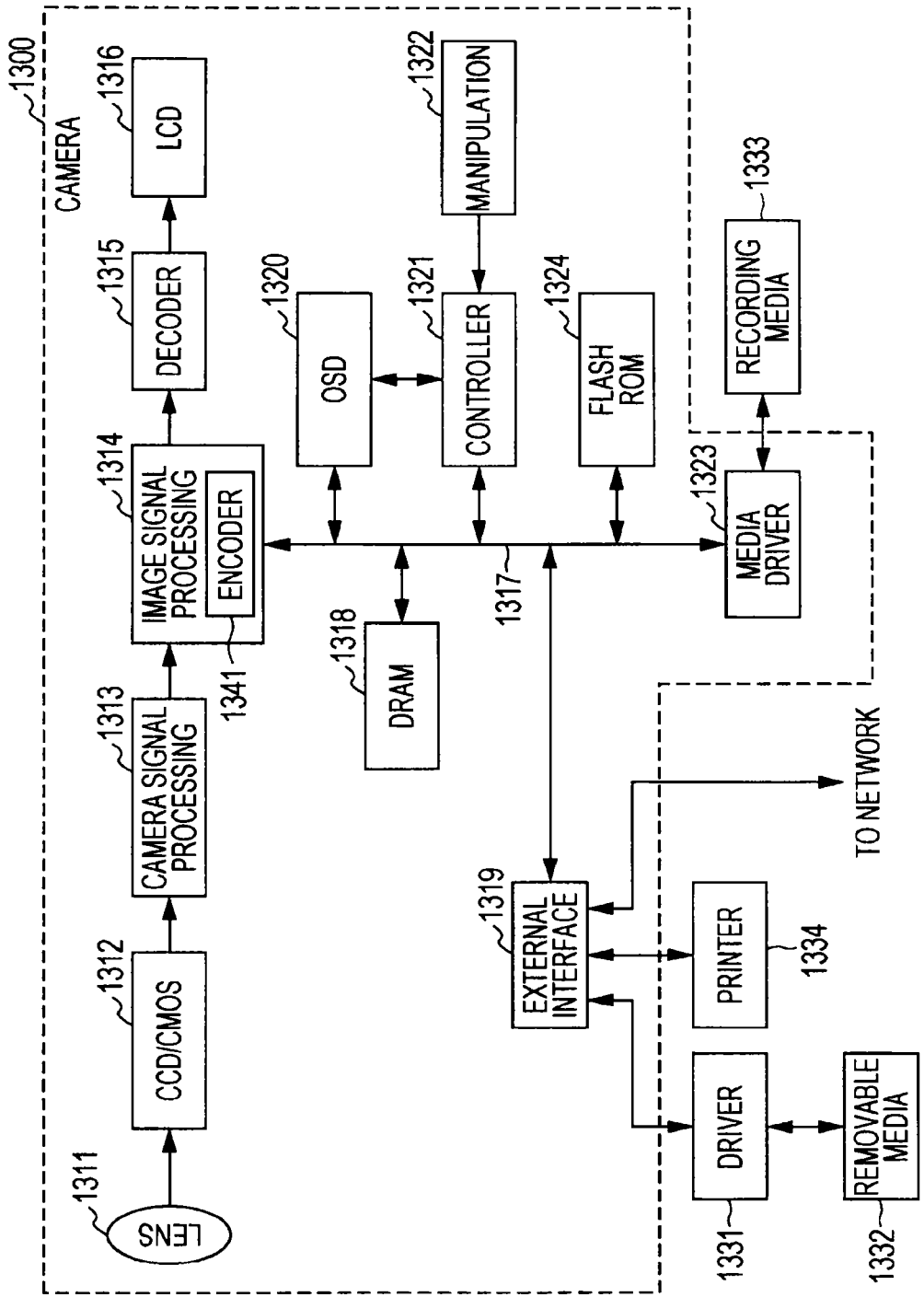
FIG. 24 is a block diagram illustrating an example of a main configuration of a camera according to an embodiment of the invention.

FIG. 24 is a block diagram illustrating an example of a main configuration of the camera using the image encoding apparatus and the image decoding apparatus according to an embodiment of the invention.

The camera 1300 shown in FIG. 24 captures an image of an object and displays the image of the object on the LCD 1316 or records it as image data on the recording medium 1333.

The lens block 1311 inputs the light (i.e., the image of the object) to the CCD/CMOS 1312. The CCD/CMOS 1312 is an image sensor using a CCD or a CMOS which converts the intensity of the received light into an electric signal and supplies it to the camera signal processing unit 1313.

The camera signal processing unit 1313 converts the electric signal supplied from the CCD/CMOS 1312 into a color difference signal (Y, Cr, and Cb) and supplies it to the image signal processing unit 1314. The image signal processing unit 1314 performs a predetermined image processing for the image signal supplied from the camera signal processing unit 1313 under control of the controller 1321 or recodes the image signal using the encoder 1341. The image signal processing unit 1314 supplies the encoded data created by encoding the image signal to the decoder 1315. Furthermore, the image signal processing unit 1314 obtains the display data generated in the on-screen display (OSD) 1320 and supplies them to the decoder 1315.

In the aforementioned descriptions, the camera signal processing unit 1313 appropriately uses the DRAM (Dynamic Random Access Memory) 1318 connected via the bus 1317 and stores the encoded data obtained by encoding the image data or the like in the DRAM 1318.

The decoder 1315 decodes the encoded data supplied from the image signal processing unit 1314 and supplies the resultant image data (decoded image data) to the LCD 1316. In addition, the decoder 1315 supplies the display data supplied from the image signal processing unit 1314 to the LCD 1316. The LCD 1316 appropriately synthesizes the image of the decoded image data supplied from the decoder 1315 with the image of the display data and displays the synthesized image.

The on-screen display 1320 outputs the display data such as a menu window or an icon including a symbol, a character, or a figure to the image signal processing unit 1314 via the bus 1317 under control of the controller 1321.

The controller 1321 performs various processes based on the signal representing the content instructed by a user using the manipulation unit 1322 and also controls the image signal processing unit 1314, the DRAM 1318, the external interface 1319, the on-screen display 1320, the media drive 1323, or the like via the bus 1317. The programs or data or the like necessary for the controller 1321 to execute various processes are stored in the flash ROM 1324.

For example, the controller 1321 may encode the image data stored in the DRAM 1318 or decode the encoded data stored in the DRAM 1318 instead of the image signal processing unit 1314 or the decoder 1315. In this case, the controller 1321 may perform the encoding or the decoding using the same scheme as the encoding or decoding scheme of the image signal processing unit 1314 or the decoder 1315 or may perform the encoding or the decoding using a scheme different from that of the image signal processing unit 1314 or the decoder 1315.

For example, when the initiation of the image printing is instructed from the manipulation unit 1322, the controller 1321 reads the image data from the DRAM 1318 and supplies the image data to the printer 1334 connected to the external interface 1319 via the bus 1317 to print them.

For example, when it is instructed from the manipulation unit 1322 to record the image, the controller 1321 reads the encoded data from the DRAM 1318 and supplies the encoded data to the recording medium 1333 installed in the media drive 1323 via the bus 1317 to store them.

The recording medium 1333 is any readable/writable removable medium such as a magnetic disc, an optical magnetic disc, an optical disc, or a semiconductor memory. The type of the recording medium 1333 as well as the type of the removable medium may be arbitrarily selected from a tape device, a disc, a memory card, or the like. Of course, a non-contact IC card may be used.

In addition, the media drive 1323 and the recording medium 1333 may be integrated into a single body and configured by a non-portable storage medium such as an internal hard disc drive or an SSD (Solid State Drive).

When the external interface 1319 is configured of, for example, a USB input/output terminal or the like to print out the image, the external interface 1319 is connected to the printer 1334. In addition, the external interface 1319 is connected to the drive 1331 as necessary, and a removable medium 1332 such as a magnetic disc, an optical disc, or an optical magnetic disc is appropriately installed therein so that the computer program read therefrom is installed in the flash ROM 1324 as necessary.

Furthermore, the external interface 1319 has a network interface connected to a predetermined network such as a LAN or the Internet. The controller 1321 may read the encoded data from the DRAM 1318, for example, according to an instruction from the manipulation unit 1322 and supply the encoded data from the external interface 1319 to other devices connected via a network. In addition, the controller 1321 may obtain the encoded data or the image data supplied from other devices via a network using an external interface 1319 and store them in the DRAM 1318 or supply them to the image signal processing unit 1314.

The camera 1300 described above uses the image decoding apparatus 200 as the decoder 1315. Therefore, similar to the image decoding apparatus 200, the decoder 1315 appropriately decodes the image compression information including only the filter block flag demanded by the image encoding apparatus 100. Therefore, as a result, it is possible to suppress degradation of the encoding efficiency by locally controlling the filtering. For example, even when each frame of the image is divided into a plurality of slices, and the image compression information encoded for each slice is decoded using the adaptive filter and output, it is possible to suppress degradation of the encoding efficiency.

Therefore, the camera 1300 can appropriately decode the image compression information including only the filter block flag demanded by the image encoding apparatus 100. As a result, the camera 1300 can suppress degradation of the encoding efficiency for locally controlling the filtering, for example, for the image data generated in the CCD/CMOS 1312, the encoded data of the video data read from the recording medium 1333, or the encoded data of the video data obtained via a network.

In addition, the camera 1300 uses the image encoding apparatus 100 as the encoder 1341. Therefore, similar to the image encoding apparatus 100, the encoder 1341 can suppress degradation of the encoding efficiency by locally controlling the filtering. For example, even when each frame of the image is divided into a plurality of slices, and each slice is encoded using the adaptive filter and output, the encoder 1341 can suppress degradation of the encoding efficiency.

Therefore, the camera 1300 can suppress degradation of the encoding efficiency by locally controlling the filtering, for example, for the encoded data recorded in the DRAM 1318 or the recording medium 1333 or the encoded data provided to other devices. As a result, the camera 1300 can more efficiently use the storage area of the DRAM 1318 or the recording medium 1333. In addition, the camera 1300 can provide the encoded data (image data) having an excellent encoding efficiency to other devices.

In addition, the decoding method of the image decoding apparatus 200 may be applied to the decoding process of the controller 1321. Similarly, the encoding method of the image encoding apparatus 100 may be applied to the encoding of the controller 1321.

In addition, the image data captured by the camera 1300 may be a moving picture or a still image.

Of course, the image encoding apparatus 100 and the image decoding apparatus 200 may be applied to an apparatus or a system other than the aforementioned apparatus.

In addition, the size of the macroblock is not limited to the 16×16 pixel. For example, all sizes of the macroblocks such as the 32×32 pixels shown in FIG. 25 can be used.

While, in the aforementioned descriptions, the flag information or the like is multiplexed (described) in the bit stream, for example, the flag and the image data (or the bit stream) may be transmitted (recorded) in addition to the multiplexing. An embodiment in which the flag is linked (added) to the image data (or bit stream) may be possible.

The linking (addition) refers to a state that the image data (or the bit stream) and the flag are linked to each other, and a relationship of their physical locations is arbitrarily set. For example, the image data (or the bit stream) and the flag may be transmitted to different transmission lines. In addition, the image data (or the bit stream) and the flag may be recorded in different recording media (or different recording area within the same recording medium). In addition, a unit for linking between the image data (or the bit stream) and the flag may be arbitrarily set and, for example, may be set to an encoding unit (such as a single frame or a plurality of frames).

The present application contains subject matter related to that disclosed in Japanese Priority Patent Application JP 2009-179394 filed in the Japan Patent Office on Jul. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
processing circuitry configured to
receive information related to a size of a largest image block basis of a quad tree structure,
determine a location of the largest image block according to the received information related to the size of the largest image block,
determine whether the largest image block at the location is included in a processing-target slice area,
receive control data indicating whether filtering is performed for the largest image block, and
filter data of the largest image block at the determined location if the largest image block at the determined location is included in the processing-target slice area and the control data indicates that the filtering is performed for the largest image block, the data of the largest block not being filtered if the control data indicates that the filtering is not performed for the largest image block.

2. The information processing apparatus according to claim 1, wherein the processing circuitry is further configured to wirelessly receive image data including the largest image block.

3. The information processing apparatus according to claim 1, wherein the processing circuitry is further configured to store the information related to the size of the largest image block and the determined location.

4. The information processing apparatus according to claim 1, wherein the processing circuitry is further configured to control display of image data including the largest image block on a display.

5. The information processing apparatus according to claim 1, wherein the circuitry is further configured to power the information processing apparatus from a battery.

6. An information processing method, comprising:
receiving information related to a size of a largest image block basis of a quad tree structure;
determining a location of the largest image block according to the received information related to the size of the largest image block;
determining whether the largest image block at the location is included in a processing-target slice area;
receiving control data indicating whether filtering is performed for the largest image block; and
filtering data of the largest image block at the determined location if the largest image block at the determined location is included in the processing-target slice area and the control data indicates that the filtering is performed for the largest image block, the data of the largest block not being filtered if the control data indicates that the filtering is not performed for the largest image block.

7. The information processing method according to claim 6, wherein the largest image block is included in wirelessly received image data.

8. The information processing method according to claim 6, further comprising:
storing the information related to the size of the largest image block and the determined location.

9. The information processing method according to claim 6, further comprising:
controlling display of image data including the largest image block on a display.

10. The information processing method according to claim 6, further comprising:
powering the information processing apparatus from a battery.

11. A non-transitory computer-readable medium encoded with computer-readable instructions thereon, the computer-readable instructions when executed by a computer cause the computer to perform a method comprising:
receiving information related to a size of a largest image block basis of a quad tree structure;
determining a location of the largest image block according to the received information related to the size of the largest image block;
determining whether the largest image block at the location is included in a processing-target slice area;
receiving control data indicating whether filtering is performed for the largest image block; and
filtering data of the largest image block at the determined location if the largest image block at the determined location is included in the processing-target slice area and the control data indicates that the filtering is performed for the largest image block, the data of the largest block not being filtered if the control data indicates that the filtering is not performed for the largest image block.

* * * * *